(12) United States Patent
Lovett et al.

(10) Patent No.: US 10,609,223 B2
(45) Date of Patent: Mar. 31, 2020

(54) MULTI-WIRELESS ACCESS SERVICE AND REPEATER SERVICE OF AUTOMATED METER READING SYSTEM

(71) Applicant: Neptune Technology Group Inc., Tallassee, AL (US)

(72) Inventors: Jerry Wayne Lovett, Auburn, AL (US); Steven Donald Bragg, Tallassee, AL (US)

(73) Assignee: Neptune Technology Group Inc., Tallassee, AL (US)

( * ) Notice: Subject to any disclaimer, the term of this patent is extended or adjusted under 35 U.S.C. 154(b) by 0 days.

(21) Appl. No.: 16/542,539

(22) Filed: Aug. 16, 2019

(65) Prior Publication Data

US 2020/0076954 A1 Mar. 5, 2020

Related U.S. Application Data

(60) Provisional application No. 62/725,630, filed on Aug. 31, 2018.

(51) Int. Cl.
*H04M 11/00* (2006.01)
*H04W 92/14* (2009.01)
*H04W 4/12* (2009.01)
*G08C 17/02* (2006.01)

(52) U.S. Cl.
CPC .......... *H04M 11/002* (2013.01); *H04W 4/12* (2013.01); *H04W 92/14* (2013.01); *G08C 17/02* (2013.01)

(58) Field of Classification Search
CPC ...... H04M 11/00; H04M 11/002; H04W 4/12; H04W 92/14; G01D 4/002; G01D 4/004; G01D 4/006; H04Q 2209/60
USPC ..... 379/106.01, 106.03; 340/870.02, 870.03, 340/870.14
See application file for complete search history.

(56) References Cited

U.S. PATENT DOCUMENTS

| | | | |
|---|---|---|---|
| 7,417,557 B2 * | 8/2008 | Osterloh ................ | G01D 4/004 340/870.02 |
| 2006/0023853 A1 * | 2/2006 | Shelley .................. | G01D 4/004 379/106.03 |
| 2011/0068947 A1 * | 3/2011 | Holman ................ | G01D 4/004 340/870.02 |

* cited by examiner

*Primary Examiner* — Melur Ramakrishnaiah
(74) *Attorney, Agent, or Firm* — Snyder, Clark, Lesch & Chung, LLP

(57) ABSTRACT

A device and a non-transitory storage medium are described in which a collector device comprises a first wireless communication interface of a first wireless network configured to receive messages from and transmit messages to a meter interface unit of a utility meter; and a second wireless communication interface of a second wireless network configured to receive messages from and transmit messages to the meter interface unit, wherein the second wireless network is a third party wireless network and the first wireless network is not, and wherein the first wireless communication interface and the second wireless communication interface are configured to operate in a simultaneous mode of communication that provides for a simultaneous transmission to or simultaneous reception of messages from the meter interface unit.

20 Claims, 19 Drawing Sheets

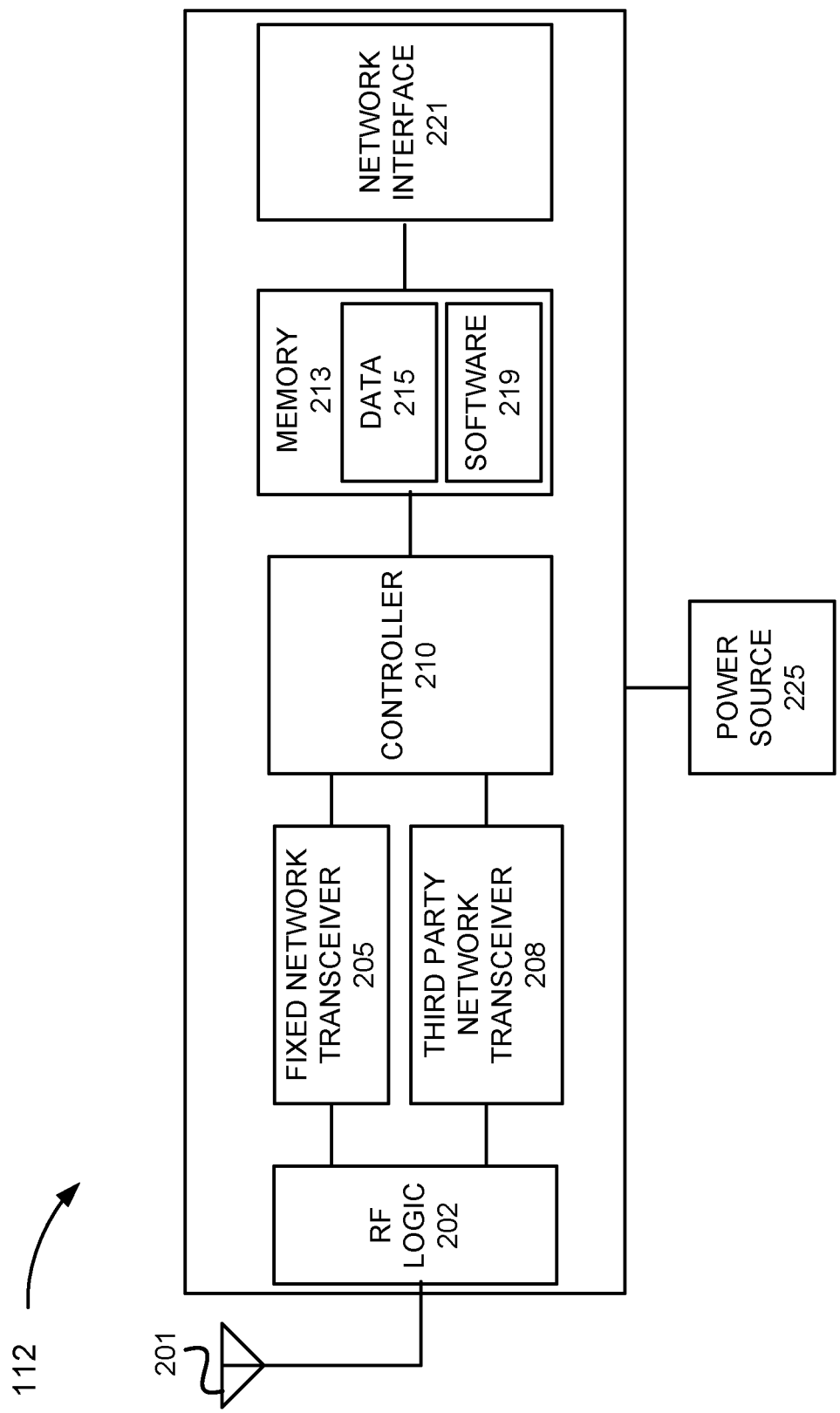

MULTI-WIRELESS ACCESS SERVICE AND REPEATER SERVICE OF AUTOMATED METER READING SYSTEM

CROSS-REFERENCE TO RELATED APPLICATION

The present application claims priority to U.S. Provisional Patent Application No. 62/725,630 filed Aug. 31, 2018, the entirety of which is hereby incorporated by reference herein.

BACKGROUND

Utility companies and other entities operate distribution systems for various resources (e.g., water, gas, electricity, chemicals, etc.) to deliver these resources to customers connected to the distribution systems. A meter may be used at each point the resource is removed and/or provided from the distribution system to a customer to measure usage. Many metering systems use wireless communications to report meter readings to a backend system via a communication network. The communication network may include network devices that can transmit and receive data.

BRIEF DESCRIPTION OF THE DRAWINGS

FIG. 2A is a diagram illustrating exemplary components of an exemplary embodiment of a collector depicted in FIG. 1;

DETAILED DESCRIPTION OF PREFERRED EMBODIMENTS

Figure 1:
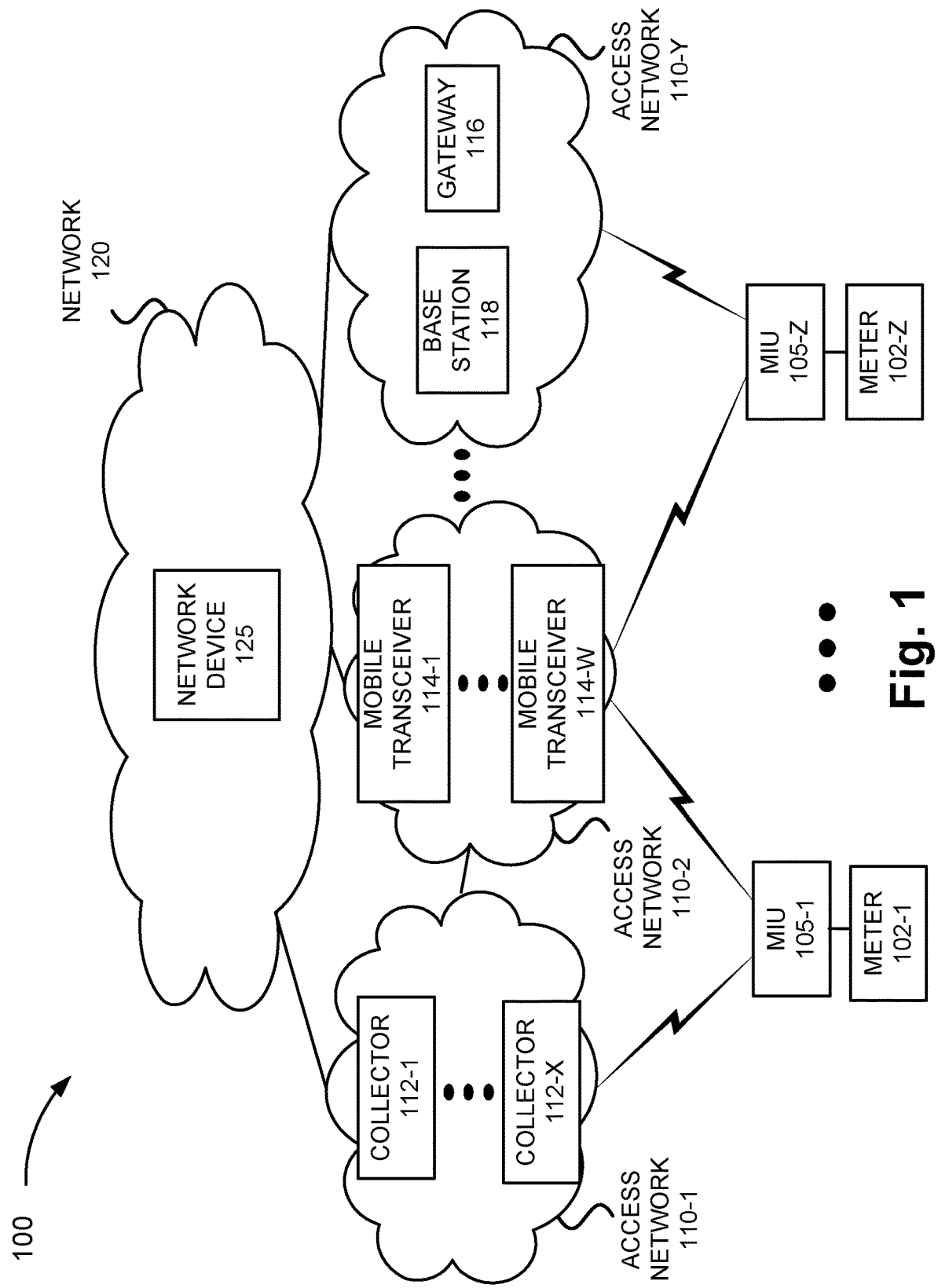
FIG. 1 is a diagram illustrating an exemplary environment in which an exemplary embodiment of a multi-wireless access service and a repeater service may be implemented.

The following detailed description refers to the accompanying drawings. The same reference numbers in different drawings may identify the same or similar elements. Also, the following detailed description does not limit the invention.

Meters that measure usage of a resource, such as a utility resource (e.g., water, gas, electricity, etc.) or another type of resource (e.g., chemical, etc.) are widely used. Further, meters have been combined with electronic components to facilitate communication between the meters and backend systems via a network. For example, a meter interface unit (MIU) may include a transmitter that is configured to wirelessly transmit usage information and other information (e.g., leak information, reverse flow detection, etc.). The MIU may also include a receiver that is configured to wirelessly receive information and commands. The meter and the MIU may be a part of an automated meter reading (AMR) system, such as an AMR system associated with a water utility company, an advanced metering system (AMS), an advanced meter infrastructure (AMI), or another type of architecture associated with a utility company or another entity.

The MIU may use one or multiple networks for communication. For example, the MIU may transmit information to a mobile transceiver of a wireless network. The mobile transceiver may be implemented as a handheld device, which may be operated by a user (e.g., an employee of a utility company). Alternatively, for example, the mobile transceiver may be implemented as a vehicle mount to a utility vehicle. Additionally, or alternatively, the MIU may communicate with a network device of a fixed network or a proprietary network of an entity (e.g., a utility company). For example, the network device (e.g., often referred to as "gateway" or a "collector") may be physically situated in proximity to the MIU. The mobile transceiver and the network device may be managed by the entity (e.g., a utility company) of the system.

Despite the use of mobile transceivers and fixed/proprietary networks by MIUs to communicate with backhaul systems, the deployment of different types of third party wireless networks in various geographic areas may be an eventuality. For example, in a given geographic locale, there may be a third party wireless network, such as a Long Range wide area network (LoRaWAN), a Sigfox low-power WAN (LPWAN), an Ingenu machine network, and/or another type of wireless network that may be wirelessly accessible to an MIU for communication. However, this access and use of another wireless network may be problematic. For example, the MIU may not be configured to access and use the other wireless network because at the time of installation of the MIU, the wireless network did not exist. According to another example, the third party wireless network may have existed at the time of installation of the MIU, but a business relationship between an entity (e.g., a utility company) managing the MIU, the network operator or service provider of the third party wireless network, and other parties (e.g., customers of the utility company, etc.) has not been formed to permit such access and use. As a result, from a network-side perspective, the MIUs of a given locale may have different wireless capabilities, and the network device of a fixed/proprietary network and/or mobile transceiver network may not be configured to support these differing communication capabilities of the MIUs.

Consequently, the entity may have to manufacture and install different versions of the network device in order to accommodate differing wireless capabilities of the MIUs. Such an approach, however, may be cost prohibitive to the entity. Additionally, or alternatively, the entity may have to reconfigure an installed network device when an MIU, which the network device serves, is replaced with a new MIU or the MIU is reconfigured with a wireless capability not supported by the network device. Unfortunately, reconfiguration of the network device necessarily entails usage of various network resources (e.g., processor, memory, etc.) of the network device being reconfigured, and perhaps network resources of other network devices and communication links of the network. Additionally, the reconfiguration procedure may be subject to errors occurring, intervention by network administrators, and further usage of various resources when errors do occur.

A network device that may be considered a legacy device may still be useful in transmitting data to and receiving data from MIUs and other devices of the system. However, a lack of internetworking between the legacy network device and a network device that supports third party wireless communication may prevent optimal communication (e.g., routing, etc.) with backend systems and MIUs.

Furthermore, as a consequence of internetworking, various problems may arise pertaining to the transmission and reception of messages. For example, the network may need to manage differing message formats, use of different protocols, use of different types of messages, and/or other communication parameters that may stem from such internetworking between one party's network (e.g., a mobile transceiver network, a fixed/proprietary network) and a third party network (e.g., a third party wireless network).

According to exemplary embodiments, a network device of an access network, which supports a system (e.g., an AMR system, an AMI system, an AMS, etc.), includes a component that provides a multi-wireless access service. According to an exemplary embodiment, the network device includes components that support fixed/proprietary network communication for an MIU, one or multiple third party wireless network communications for the MIU, and communication with a backend/backhaul system. According to other exemplary embodiments, the network device may support additional, different, and/or fewer wireless networks.

According to an exemplary embodiment, the network device supports single and multi-mode communications to and from the MIU. For example, the network device may receive meter usage data (e.g., water usage information) from the MIU using fixed/proprietary network communication (e.g., asynchronous communication), meter usage data from the MIU using a third party wireless network communication (e.g., synchronous communication), or both. According to an exemplary implementation, the network device may include a dedicated transceiver for each type of network communication to support a simultaneous mode of communication. According to another exemplary implementation, the network device may include a transceiver that interleaves communications from different modes of communications (e.g., a third party mode, a fixed network mode) using various communication techniques (e.g., frequency hopping, time division, etc.).

According to exemplary embodiments, the network device of the access network, which supports the system, includes a component that provides a repeater service. According to an exemplary embodiment of the repeater service, the network device may receive a message, and transmit the message or a portion of the message upstream (e.g., toward or to a backend system) or downstream (e.g., toward or to an MIU).

According to another exemplary embodiment of the repeater service, the network device may receive a message, add data to the message, and transmit the message with additional data upstream or downstream. For example, the added data may be a time-of-day packet, an alarm packet, or another type of packet pertaining to the system.

According to yet another exemplary embodiment of the repeater service, the network device may receive a message, and translate the message from a message associated with one type of network to a message associated with another type of network. For example, network device may receive a message of the third party wireless network, and may convert the message to a message of the fixed/proprietary network, or vice versa. The network device may transmit the translated message upstream or downstream. According to various exemplary implementations, a message translation function may include selecting and using the same and/or different network communication protocols relative to the source message and the translated message. In this way, the network device may use its network connectivity to support two or more separate networks.

According to still another exemplary embodiment of the repeater service, the network device may collect, store, and transmit bulk data upstream or downstream. For example, the bulk data may include reformatted or summarized meter usage data from MIUs, statistical data, performance data, signal quality data, or other types of data pertaining to the system, which was collected and stored by the network device over a period of time (e.g., about 24 hours or another configurable timeframe). The network device may perform the bulk transfer process periodically and/or in response to various triggering events. For example, according to one exemplary implementation, the triggering event may be receipt of a network command message that invokes this service. According to another exemplary implementation, the triggering event may be a loss of connectivity with another network device (e.g., upstream network device/system of the system) or loss of connectivity with a downstream endpoint (e.g., an MIU). The network device may transmit the bulk data when connectivity is restored.

According to other exemplary embodiments of the repeater service, the network device may receive a software update. The software update may be intended for MIUs or another network device, in which the network device may transmit the software update to the MIUs or the other network device. Alternatively, the software update may be intended for the network device, in which case the network device may update its configuration using the software update.

According to various exemplary embodiments, the repeater service may be implemented by a collector, as described herein, or another intermediary network device (e.g., a repeater, a bridge, a switch, a relay node, a range extender device, a router, or another type of wireless node) between the MIU and remote network devices of the system.

According to still other exemplary embodiments, devices other than the network device may include a component that provides one or more functions of the repeater service, as described herein. For example, an MIU may include a component that provides one or more functions of the repeater service.

As a result, the multi-wireless access service and the repeater service may significantly improve resource utilization within a communication network and may improve communication of data (e.g., meter usage data, etc.) to/from the MIU and to/from various backend systems. Additionally, a network device that provides these services may reduce installation costs (e.g., number of permits to obtain, labor required for completion of an installation, installation of an asset (e.g., a pole or a tower to affix the network device, etc.)) and use of network resources. For example, if the network device that provides these services uses components that can share various network resources (e.g., power, antenna, network connections, etc.), such an approach optimizes the use of these network resources.

FIG. 1 is a diagram illustrating an exemplary environment 100 in which an exemplary embodiment of the services described herein may be implemented. As illustrated, environment 100 includes meters 102-1 through 102-Z, in which Z>1 (referred to collectively as meters 102 and individually (or generally) as meter 102) and MIUs 105-1 through 105-Z (referred to collectively as MIUs 105 and individually (or generally) as MIU 105). Environment 100 further includes access networks 110-1 through 110-Y, in which Y>1 (referred to collectively as access networks 110 and individually (or generally) as access network 110), and a network 120.

According to other embodiments, environment 100 may include additional networks and/or different types of networks than those illustrated and described herein. The number, the type, and the arrangement of devices in access networks 110 and network 120 are exemplary. The number and the arrangement of meters 102 and MIUs 105 are exemplary.

Environment 100 may include communication links between various network devices and networks. Additionally, MIUs 105 and devices of access networks 110 may establish communication links. The number, the type, and the arrangement of communication links illustrated in environment 100 are exemplary.

Meter 102 may include a device that is configured to measure usage of a resource. For example, meter 102 may be a water meter or another type of meter, as previously described. Various implementations of meter 102 may use different measurement technologies (e.g., ultrasonic sensing, magnetic-driven, positive displacement, etc.) to measure usage of the particular resource, such as water, and so forth.

MIU 105 may include an electronic device that collects, analyzes, and stores data from meter 102. According to one exemplary implementation, MIU 105 may be integrated into meter 102. According to another exemplary implementation, MIU 105 (or portion thereof) may be a separate component from meter 102. For example, the separate component may be communicatively coupled to meter 102 (or a remaining portion of MIU 105) via a cable or another type of connector. According to an exemplary implementation, MIU 105 may include a wireless transmitter and a wireless receiver for communication. MIU 105 may be configured to access and use multiple access networks 110.

Access networks 110 may include multiple wireless networks that may support multiple wireless (e.g., radio) technologies. For example, access network 110-1 may include a hybrid wireless network, which includes collectors 112-1 through 112-X, in which X>1 (referred to collectively as collectors 112 and individually (or generally) as collector 112). Access network 110-1 may support a system (e.g., AMR system, AMI system, AMS, etc.). Access network 110-1 may be a proprietary wireless network (e.g., owned and operated by a utility company (e.g., a water utility company, etc.)). Collector 112 may include a network device that is configured to receive, analyze, and store data from MIU 105, such as water usage information. Collector 112 may also transmit data to MIU 105 and may communicate with a backend system (e.g., network device 125 of network 120). Access network 110-1 may operate in a "one-way" communication mode, a "two-way" communication mode, or a combination of both in relation to MIU 105 and collector 112, as well in relation to collector 112 and the backend system.

According to an exemplary embodiment, collector 112 includes components that provide the multi-wireless access service, the repeater service, or both. For example, collector 112 may include a component that provides the multi-wireless access service according to a fixed/proprietary network, as previously described, and one or multiple third party networks, such as a LoRaWAN, an LPWAN, a machine network, an Evolved UMTS Terrestrial Radio Access Network (E-UTRAN), a next generation RAN (e.g., a 5G-access network), and/or a Worldwide Interoperability for Microwave Access (WiMAX) network. According to various exemplary embodiments, collector 112 may include a dedicated transceiver (and other physical resources, such as memory, processor, protocol stack logic, etc.) for each wireless service (e.g., fixed network, LoRa network, etc.) supported or may share a transceiver (and other physical resources) among multiple wireless services supported (e.g., fixed network and LoRa network, fixed and LPWAN, etc.). Additionally, or alternatively, collector 112 may include logic (e.g., a processor and software) that provides a function of the repeater service. Collector 112 is described further below regarding the multi-access service and the repeater service.

Access network 110-2 may include a mobile transceivers network, as previously described, which includes mobile transceivers 114-1 through 114-W (referred to collectively as mobile transceivers 114 and individually (or generally) as mobile transceiver 114). Access network 110-2 may support the system. Mobile transceiver 114 may include a network device that is configured to receive and store data from MIU 105. As previously described, mobile transceiver 114 may be implemented as a mobile or handheld user device (e.g., operated by a user or a technician associated with a utility company, such as a water company), a vehicle mounted device, or another suitable mobile device (e.g., a drone, etc.). Mobile transceiver 114 may also be configured to communicate with the backend system. Mobile transceiver 114 may operate in one or multiple communication modes (e.g., one-way, two-way, etc.). According to some exemplary implementations, mobile transceiver 114 may also connect to MIU 105 via a wired connection and/or another suitable communication medium (e.g., infrared, optical, etc.). For example, a utility employee/technician may connect a mobile device (e.g., a tablet, a handheld device, etc.) to MIU 105 via a cable or other suitable connector.

Access network 110-Y may include a wireless network. According to an exemplary embodiment, access network 110-Y is a third party wireless network. For example, the phrase "third party" may be relative to a utility company and its customers (e.g., associated with meter 102 and MIU 105). That is, the third party wireless network may be provided/operated by an entity external from the utility company. Access network 110-Y may be implemented to include a LoRaWAN, an LPWAN, a machine network, an Evolved UMTS Terrestrial Radio Access Network (E-UTRAN) (e.g., a Fourth Generation RAN (4G RAN)), a 4.5G RAN, a next generation RAN (e.g., a 5G-access network), a Worldwide Interoperability for Microwave Access (WiMAX) network, and/or a public land mobile network (PLMN). Access network 110-Y may also include a complementary core network of the RAN (e.g., Evolved Packet Core Network, a 5G Core network, etc.). Depending on the implementation, access network 110-Y may include various types of wireless nodes, such as, for example, a base station 118, a gateway 116, as well as other types of wireless nodes not illustrated (e.g., evolved Node B (eNB), a next generation Node B (gNB), an evolved Long Term Evolution (eLTE) eNB, a small cell device, etc.).

According to other embodiments, access network 110-Y may include a wired network. According to such an exemplary embodiment, MIU 105 may not wirelessly communicate (directly) with access network 110-Y. However, collector 112 may communicate with network device 125 and/or MIU 105 via access network 110-Y. Access network 110-Y may be implemented to include other types of networks, such as the Internet, a WAN, a metropolitan area network (MAN), a data transport network, a backhaul network, and/or other type of wired/wireless network.

Network 120 may include a network that provides access to and hosts network device 125. For example, network 120 may be implemented to include a WAN, the Internet, an Intranet, an Internet Protocol (IP) network, a wired network, a wireless network, a private network, and/or another suitable network. Network device 125 includes a device that may be configured to aggregate and process the data received from access networks 110 and MIUs 105. For example, network device 125 may be implemented to include a server device and a data management system. Additionally, for example, network device 125 may be maintained by a utility company or another entity associated with meters 102 and MIUs 105. Network device 125 may include a system that generates customer bills based on the processed meter usage data, such as the amount of water used over a period of time.

FIG. 2A is a diagram illustrating exemplary components of an exemplary embodiment of collector 112 included in access network 110-1. As illustrated, collector 112 may include an antenna 201, a radio frequency (RF) logic 202, a fixed network transceiver 205, a third party network transceiver 208, a controller 210, a memory 213, a network interface 221, and a power source 225. As further illustrated, memory 213 may store data 215 and software 219.

According to other embodiments, collector 112 may include fewer components, additional components, different components, and/or a different arrangement of components than those illustrated in FIG. 2A and described herein. For example, collector 112 may include an input component. The input component may include a button, a switch, an input port, a keypad, and/or another type of component that provides an input (e.g., user input, another device input, etc.) into collector 112. Additionally, for example, collector 112 may include an output component. The output component may include a display, a light, an output port, and/or another type of component that provides an output from collector 112. Additionally, for example, collector 112 may include a network transceiver that communicates with access network 110-2 (e.g., mobile transceiver 114).

The connections between components depicted in FIG. 2A are exemplary. According to other exemplary embodiments, there may be additional, fewer, and/or different connections between the components. According to various exemplary embodiments, collector 112 depicted in FIG. 2A may provide the multi-access wireless service, the repeater service, or both.

According to an exemplary embodiment, antenna 201, RF logic 202, fixed network transceiver 205, and third party network transceiver 208 (also referred to as end device-side communication interface) may provide two-way communication with MIU 105, and network interface 221 (also referred to as network-side communication interface) may provide two-way communication with and/or towards network device 125. The end device-side communication interface may include separate transmit/receive chains (e.g., fixed network transceiver 205 and third party network transceiver 208) that support the multi-wireless access service. For example, collector 112 may transmit data to and receive data from MIU 105 via a fixed/proprietary network and a third party network. According to various exemplary implementations, the end device-side communication interface may operate in a simultaneous mode of communication (e.g., simultaneously communicating via two or more wireless networks), may operate in an interleaving mode of communication using various communication techniques (e.g., frequency hopping, time division, etc.) to communicate via two or more wireless networks, or may operate in a unitary mode of communication (e.g., communicating via a single wireless network).

According to an exemplary embodiment, the network-side communication interface may also support multiple networks of different types (e.g., fixed/proprietary, third party wireless network, a wired network, etc.) and may operate in a simultaneous mode of communication, an interleaving mode of communication, or a unitary mode of communication. In this way, the network-side communication interface may connect to the same or different network device 125 via the same or different access network 110 and/or network 120.

Antenna 201 may include an antenna that receives and transmits wireless signals. For example, antenna 201 may be configured to receive wireless signals from and transmit wireless signals to MIU 105. Antenna 201 may include one or multiple configurations, such as single-input single-output (SISO), single-input multiple-output (SIMO), multiple-input single-output (MISO), or multiple-input multiple-output (MIMO). Antenna 201 may also be configured according to various designs and parameters pertaining to angle spread, port correlation, antenna spacing, vertical/horizontal configurations, etc., as well as other aspects of wireless transmission and reception of data (e.g., beamforming, transmit diversity, etc.).

RF logic 202 includes logic that processes wireless signals. For example, RF logic 202 may include circuitry that couples to antenna 201 to receive an RF signal via antenna 201 and circuitry that couples to antenna 201 to transmit an RF signal via antenna 201. By way of example, the circuitry may include various elements (e.g., a filter, an amplifier, an oscillator, etc.) that provide various RF frontend functions, such as antenna tuning, filtering, amplifying, RF signal routing, mixing, and so forth. RF logic 202 may include an interface to/from baseband logic (e.g., analog-to-digital (A/D) converter, digital-to-analog (D/A) converter). RF logic 202 may support multiple wireless technologies (e.g., a fixed/proprietary, a third party wireless network, etc.). Alternatively, RF logic 202 may include a separate radio chain for each wireless technology/network.

Fixed network transceiver 205 includes logic that receives, processes, and transmits signals to/from RF logic 202. For example, fixed network transceiver 205 includes a transmitter and a receiver. Fixed network transceiver 205 may include logic to generate and process baseband signals representing information of a data source. For example, baseband logic may include various elements (e.g., a modem, an encoder/decoder, a clock, a memory, protocol stack logic, etc.) that provide various baseband functions, such as digital encoding/decoding, equalization, synchronization, modulation/demodulation, and so forth. Fixed network transceiver 205 may support wireless communication of the fixed/proprietary network.

Third party network transceiver 208 includes logic that receives, processes, and transmits signals to/from RF logic 202. For example, third party network transceiver 208 includes a transmitter and a receiver. Third party network transceiver 208 may include logic to generate and process baseband signals representing information of a data source. For example, baseband logic may include various elements (e.g., a modem, an encoder/decoder, a clock, a memory, protocol stack logic, etc.) that provide various baseband functions, such as digital encoding/decoding, equalization, synchronization, modulation/demodulation, and so forth.

Third party network transceiver 208 may support one or multiple third party wireless communications (e.g., LoRaWAN, 5G, etc.).

Controller 210 may include a processor. For example, controller 210 may include a central processing unit (CPU) (e.g., one or multiple cores), a microprocessor, an application specific integrated circuit (ASIC), a programmable logic device, a system-on-chip (SoC), a microcontroller, and/or another type of component that interprets and/or executes instructions and data. Controller 210 may perform an operation and/or a process based on various techniques including, for example, multithreading, parallel processing, pipelining, interleaving, etc.

Memory 213 may include various types of memory. For example, memory 213 may include a random access memory (RAM), a dynamic random access memory (DRAM), a static random access memory (SRAM), a ferroelectric RAM, a cache, a read only memory (ROM), a programmable read only memory (PROM), an erasable PROM (EPROM), an electrically EPROM (EEPROM), a flash memory, and/or another type of memory. Memory 213 may also include a hard disk (e.g., a magnetic disk, an optical disk, a magneto-optic disk, a solid state disk, etc.) and drives for reading from and writing to the storage medium.

Data 215 may include various type of information that supports the operation of collector 212. For example, data 215 may include product information (e.g., a device identifier for a water meter, a lot number, a manufacturer date for a water meter, etc.). Data 215 may include other types of information including, for example, ambient temperature, time stamps for received data, received signal strength indicator (RSSI) of a signal, radio frequency (RF) noise flow data, gateway revision information, gateway identifiers, network identifiers, and/or other types of information that facilitate the operation of collector 114.

Software 219 includes an application, a program, or another form of instructions that provides a function and/or a process. As an example, software 219 may include instructions that, when executed by controller 210, provide functions of the multi-wireless access service and/or the repeater service, as described herein. Additionally, as another example, software 219 may include instructions that, when executed by controller 210, provides functions of other services associated with an AMR system, an AMI system, an AMS, or another architecture associated with a utility company. Software 219 may also include firmware, middleware, microcode, hardware description language (HDL), and/or another form of instructions. Software 219 may further include an operating system (OS).

Network interface 221 includes logic that communicates with other network devices. For example, network interface 221 may include logic to communicate with network devices of access network 110-Y (e.g., gateway 116, base station 118, etc.), network device 125, mobile transceiver 114 of access network 110-2, and other collectors 112 of access network 110-1. Network interface 221 may include logic that supports wireless communication, wired communication, and/or optical communication. Network interface 221 may operate according to a third party communication standard (e.g., LoRa, LTE, 5G, etc.), and a non-standard (e.g., proprietary). Network interface 221 may include various processing logic or circuitry that may provide various communication-related functions (e.g., multiplexing/de-multiplexing, filtering, amplifying, digital/analog converting, error correcting, modulating/de-modulating, etc.). Network interface 221 may include RF logic, intermediary logic (e.g., D-A converter, A-D converter, etc.), and baseband logic. Although not illustrated, network interface 221 may include an antenna 201.

Power source 225 may include a battery or another suitable source for electrical current, such as a local power grid, a local generator (e.g., a photoelectric generator, etc.), and so forth.

Figure 2B:
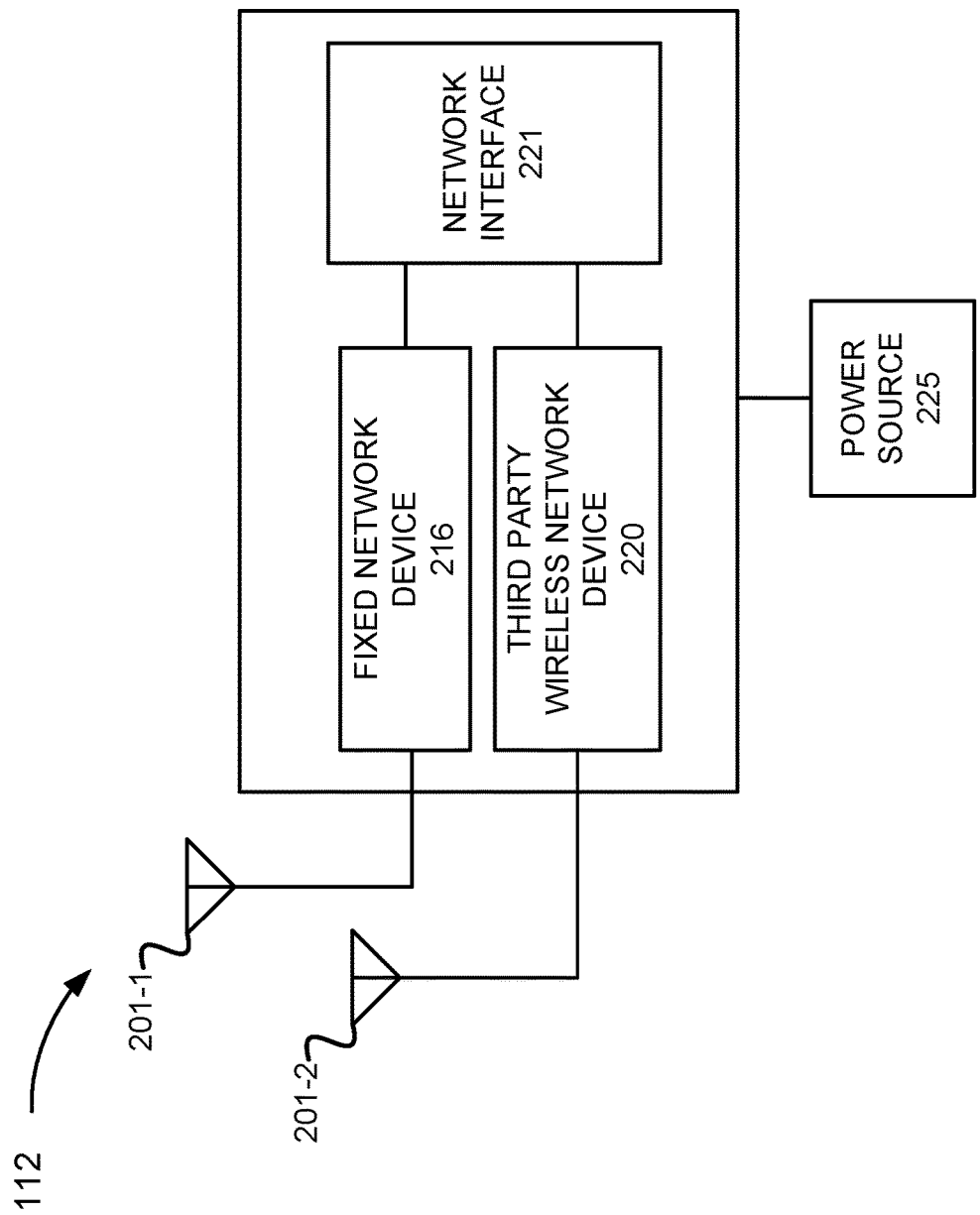
FIG. 2B is a diagram illustrating exemplary components of another exemplary embodiment of the collector depicted in FIG. 1.

FIG. 2B is a diagram illustrating exemplary components of another exemplary embodiment of collector 112. As illustrated, controller 112 may include antennas 201-1 and 201-2, a fixed network device 216, a third party wireless network device 220, network interface 221, and power source 225. According to other embodiments, collector 112 may include fewer components, additional components, different components, and/or a different arrangement of components than those illustrated in FIG. 2B and described herein. For example, there may be fewer or additional antennas 201. Additionally, for example, collector 112 may include a mobile transceiver network device that communicates with access network 110-2 (e.g., mobile transceiver 114).

The connections between components depicted in FIG. 2B are exemplary. According to other exemplary embodiments, there may be additional, fewer, and/or different connections between the components. According to various exemplary embodiments, collector 112 depicted in FIG. 2B may provide the multi-access wireless service, the repeater service, or both. Antenna 201, network interface 221, and power source 225 have been previously described.

In contrast to the exemplary embodiment depicted in FIG. 2A, collector 112 of FIG. 2B may include separate network devices that share a network connection within a same enclosure. For example, fixed network device 216 may include logic of the end device-side communication interface for a fixed/proprietary network, and third party wireless network device 220 may include logic of the end device-side communication interface for a third party wireless network.

Figure 2C:
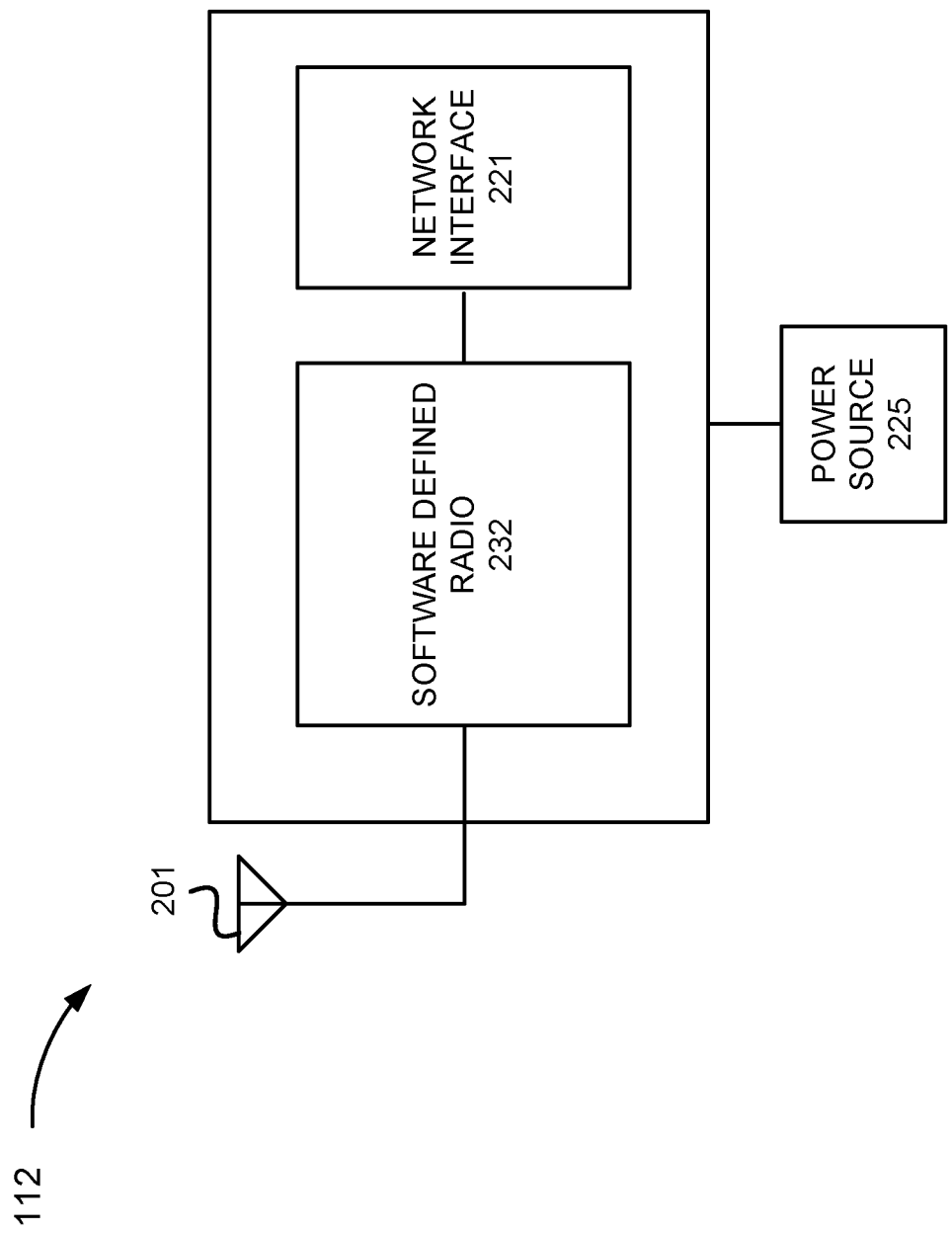
FIG. 2C is a diagram illustrating exemplary components of yet another exemplary embodiment of the collector depicted in FIG. 1.

FIG. 2C is a diagram illustrating exemplary components of yet another exemplary embodiment of collector 112. As illustrated, controller 112 may include antenna 201, a software defined radio (SDR) 232, network interface 221, and power source 225. According to other embodiments, collector 112 may include fewer components, additional components, different components, and/or a different arrangement of components than those illustrated in FIG. 2C and described herein.

The connections between components depicted in FIG. 2C are exemplary. According to other exemplary embodiments, there may be additional, fewer, and/or different connections between the components. According to various exemplary embodiments, collector 112 depicted in FIG. 2C may provide the multi-access wireless service, the repeater service, or both. Antenna 201, network interface 221, and power source 225 have been previously described.

In contrast to the exemplary embodiments depicted in FIGS. 2A and 2B, collector 112 of FIG. 2C includes SDR 232 that may be configured to support the simultaneous communication mode, the unitary communication mode, or the interleaving mode, in relation to two or more wireless networks (e.g., fixed/proprietary network, a third party wireless network, a mobile transceiver network). SDR 232 may be implemented as software, which when executed by hardware (e.g., a processor) may provide the functions of various elements previously described (e.g., RF frontend, A/D converter, digital signal processing, baseband logic, etc.).

Figure 3A:
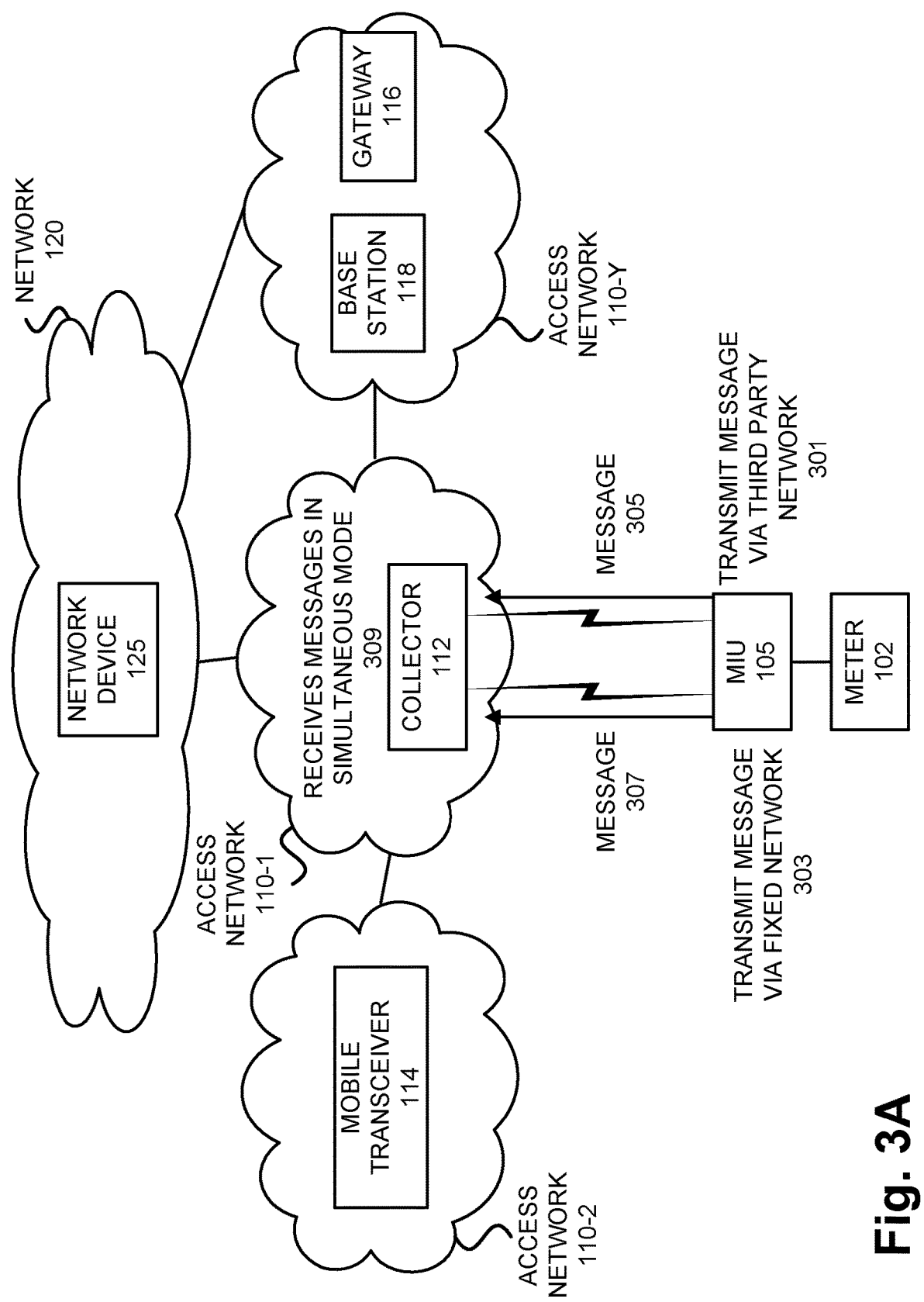
FIGS. 3A-3E are diagrams illustrating processes of exemplary embodiments of the multi-wireless access service.
Figure 3B:
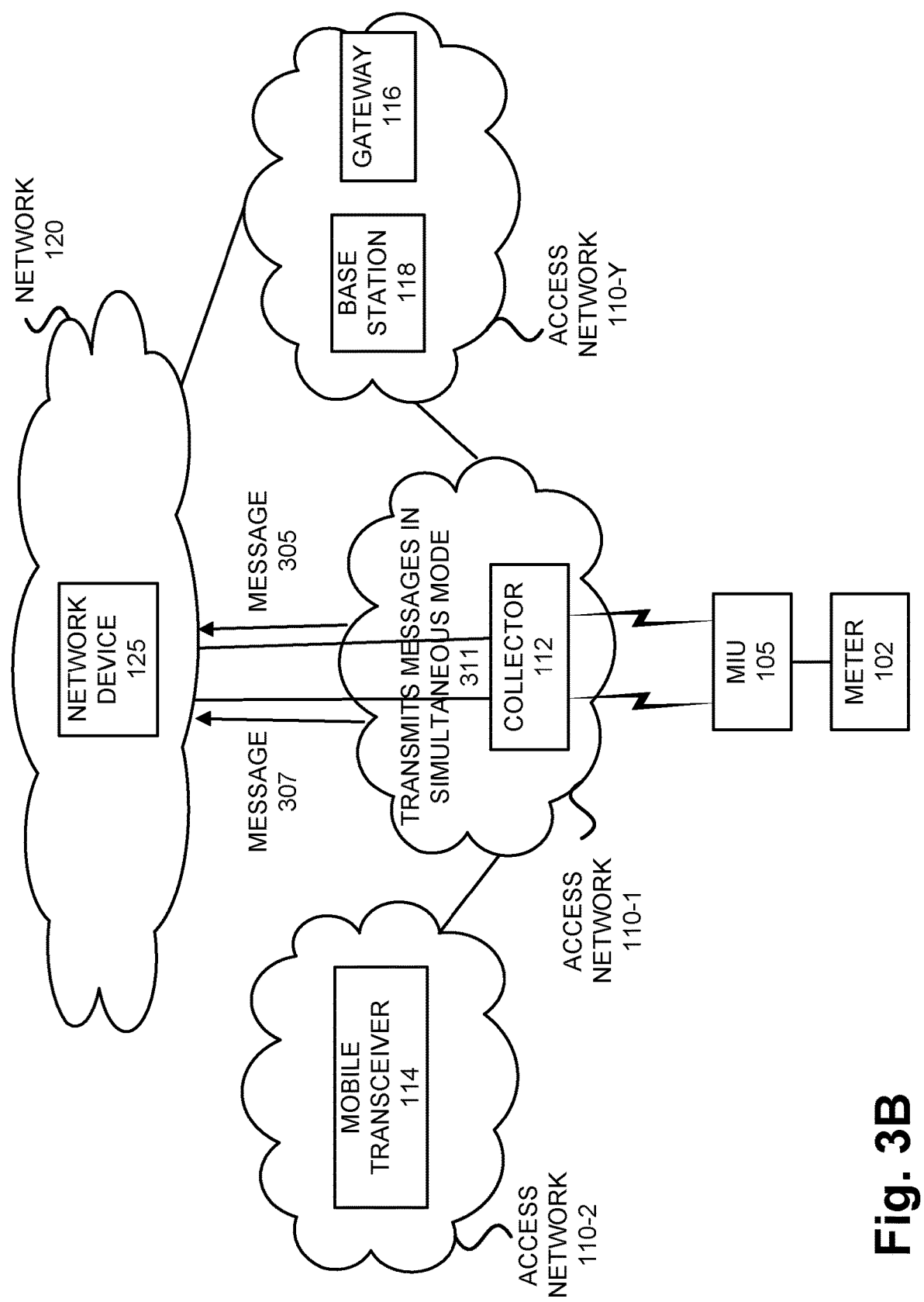
Figure 3C:
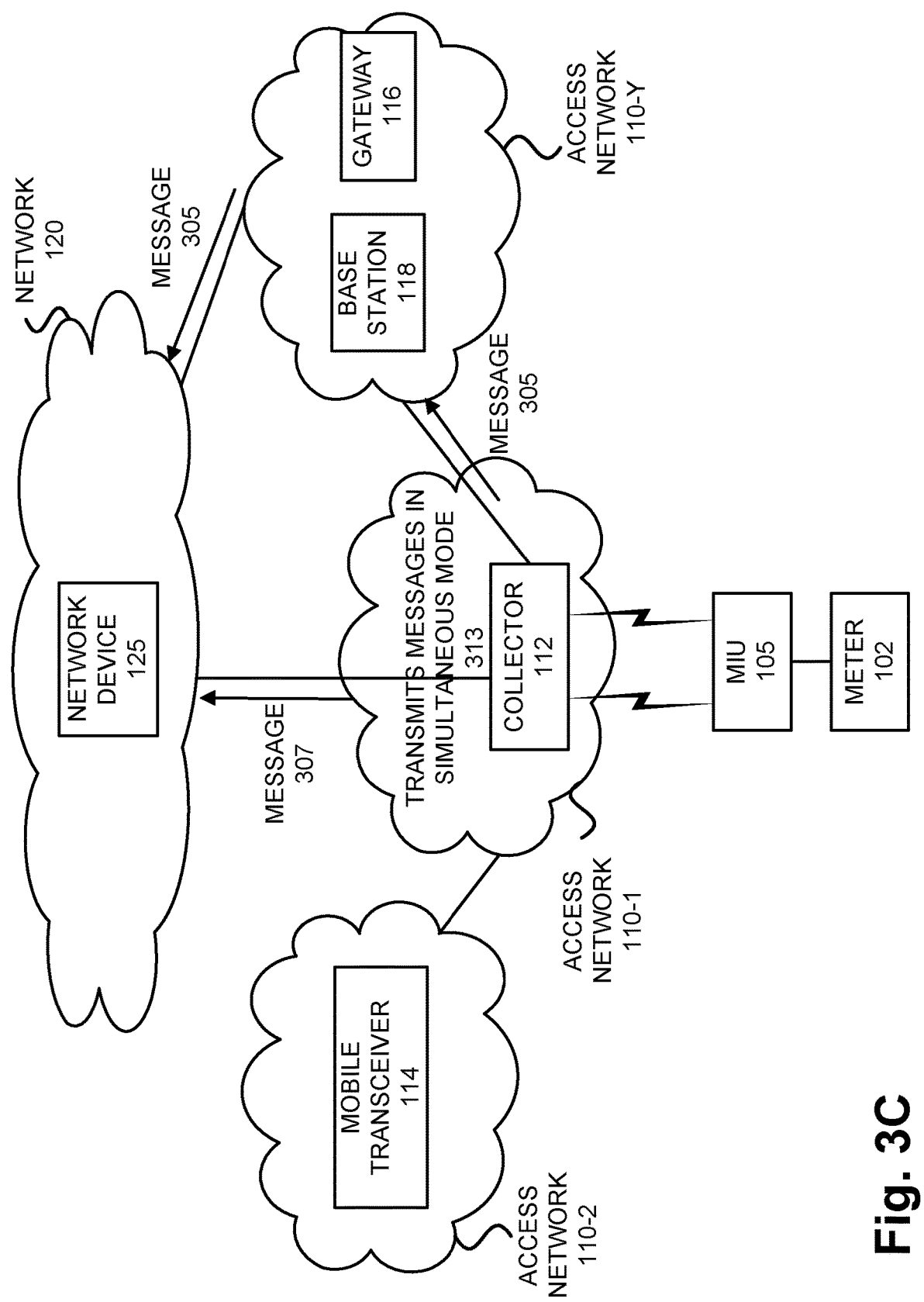

FIGS. 3A-3C are diagrams illustrating exemplary processes of the multi-wireless access service. According to an exemplary scenario, assume MIU 105 is operating in a simultaneous mode of communication in which dual connectivity via a fixed/proprietary wireless network and a third party wireless network is used.

Referring to FIG. 3A, MIU 105 may transmit a message via a communication link of a third party network 301, and may transmit a message via a communication link of a fixed/proprietary network 303 while operating in the simultaneous mode. As further illustrated, as a result of the transmissions, a message 305 and a message 307 may be transmitted to collector 112, which provides the multi-access wireless service. Collector 112 may receive messages 305 and 307, via the end device-side communication interface, while operating in a simultaneous mode of communication 309.

Referring to FIG. 3B, according to an exemplary scenario, controller 112 may transmit messages 305 and 307, via the network-side communication interface, while operating in the simultaneous mode of communication 311. According to this example, the network-side communication interface may be connected to separate communication links that support the fixed/proprietary network and the third party network via which messages 305 and 307 may be simultaneously transmitted towards/to network device 125.

According to some exemplary implementations, there may be multiple network devices 125 in which each network device 125 supports a different network type (e.g., fixed/proprietary network, third party network, etc.) and communications therefrom. In this way, message translation may not be necessary.

Referring to FIG. 3C, according to another exemplary scenario, while operating in the simultaneous mode of communication 313, the network-side communication interface may be connected to separate communication links that support the fixed/proprietary network and the third party network via which messages 305 and 307 may be transmitted towards/to network device 125. However, in contrast to FIG. 3B, a route to network device 125 may include a path via access network 110-Y. For example, message 305 may be transmitted via a third party network of access network 110-Y.

Figure 3D:
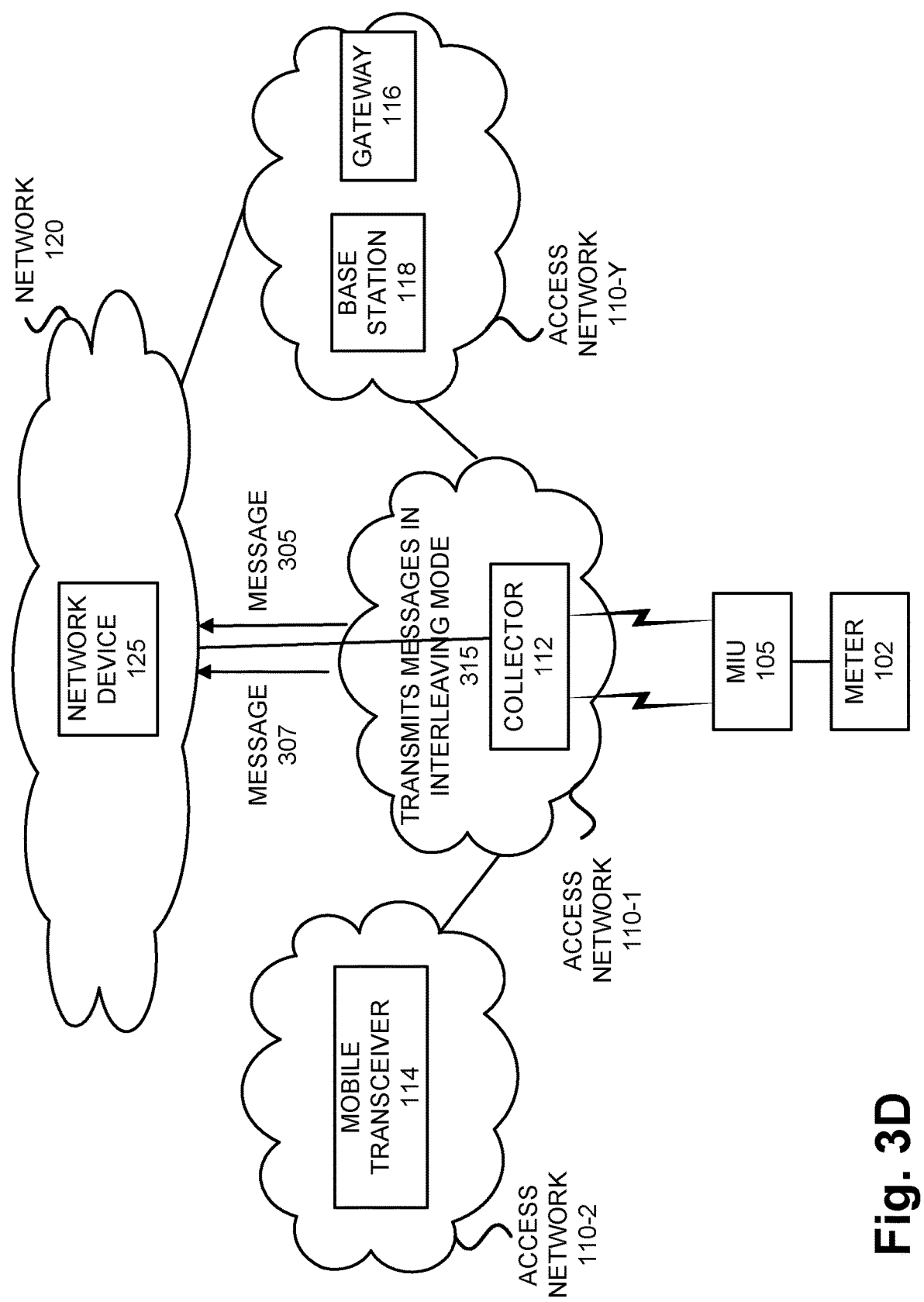
Figure 3E:
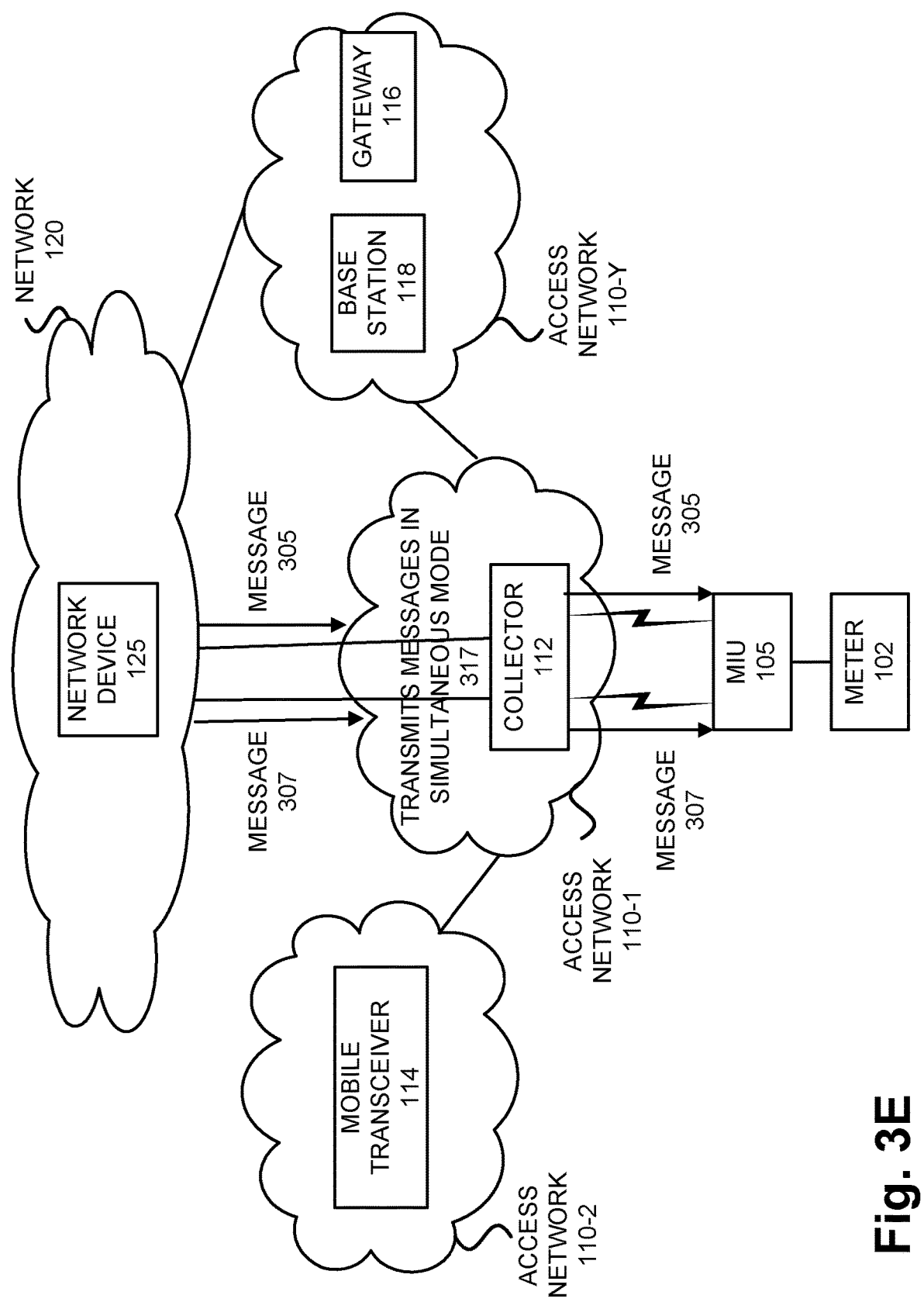

While FIGS. 3A-3C are diagrams illustrating exemplary processes of the multi-wireless access service, according to other exemplary embodiments, additional and/or different operations may be performed. For example, as illustrated in FIG. 3D, collector 112 may transmit messages in an interleaving mode 315, which may share a same communication link, or use separate communication links. By way of further example, collector 112 may interleave a message associated with the fixed/proprietary network and a message associated with a third party network. Alternatively, for example, collector 112 may interleave a portion of a message using the fixed/proprietary network, and a remaining portion of the message using the third party network. Additionally, for example, as illustrated in FIG. 3E, collector 112 may receive messages 305 and 307 via the network-side communication interface from network device 125. In response to receiving messages 305 and 307, collector 112 may transmit messages 305 and 307, in simultaneous mode 317, toward MIU 105 via the end device-side communication interface.

Also, for example, other exemplary scenarios of a process of the multi-wireless access service may involve a mode of operation different from that described in relation to FIGS. 3A-3E, a fewer number of messages than those described, a different number and/or type of communication link involved/used, a different direction of communication (e.g., upstream, downstream), and so forth.

Figure 4A:
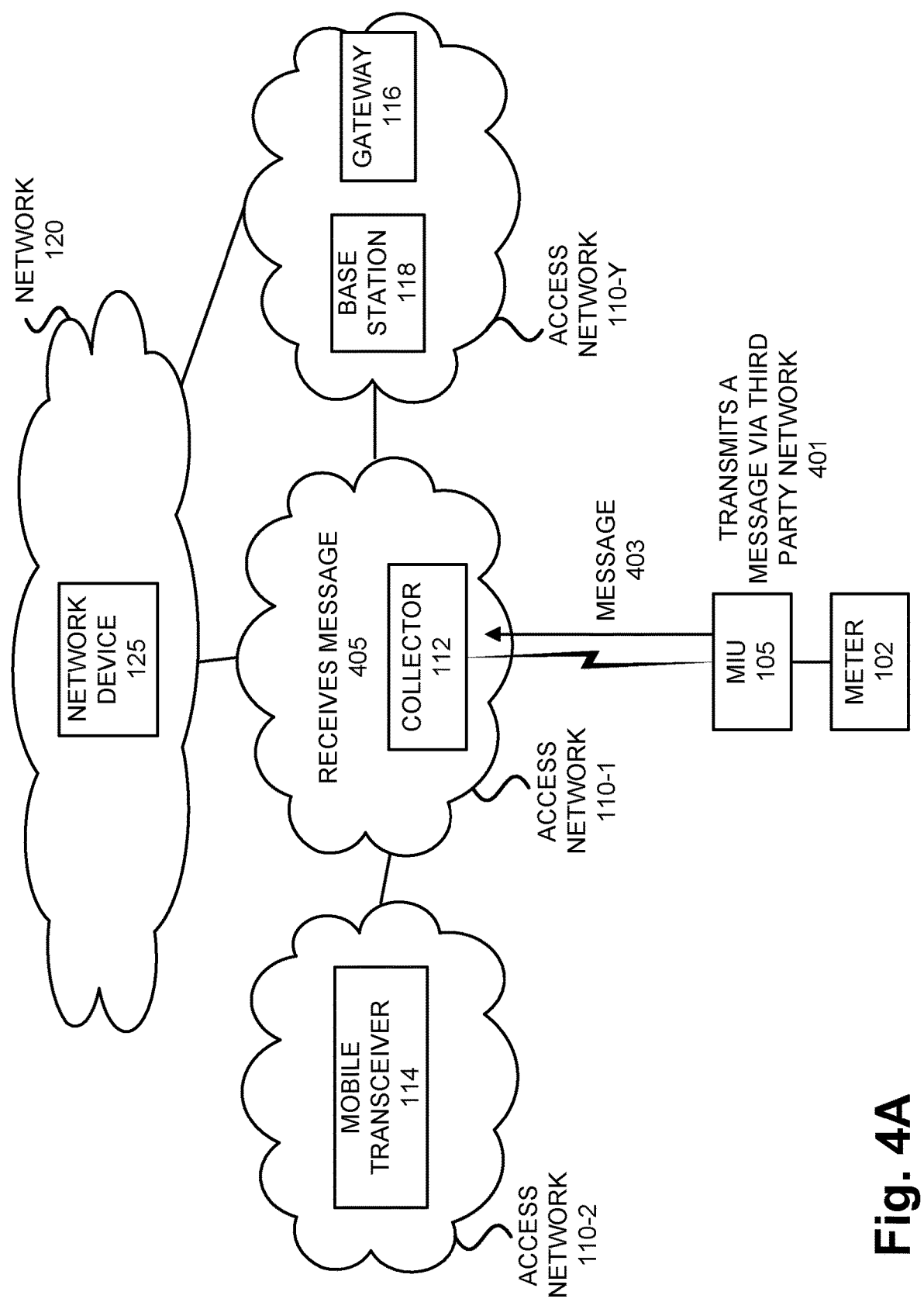
FIGS. 4A-4F are diagrams illustrating processes of exemplary embodiments of the repeater service.

FIGS. 4A-4F are diagrams illustrating exemplary processes of the repeater service. Referring to FIG. 4A, according to an exemplary scenario, assume that MIU 105 may transmit a message via a communication link of a third party network 401. As further illustrated, as a result of the transmission, a message 403 may be transmitted to collector 112, which provides the repeater service. Collector 112 may receive message 405 via the end device-side communication interface.

Figure 4B:
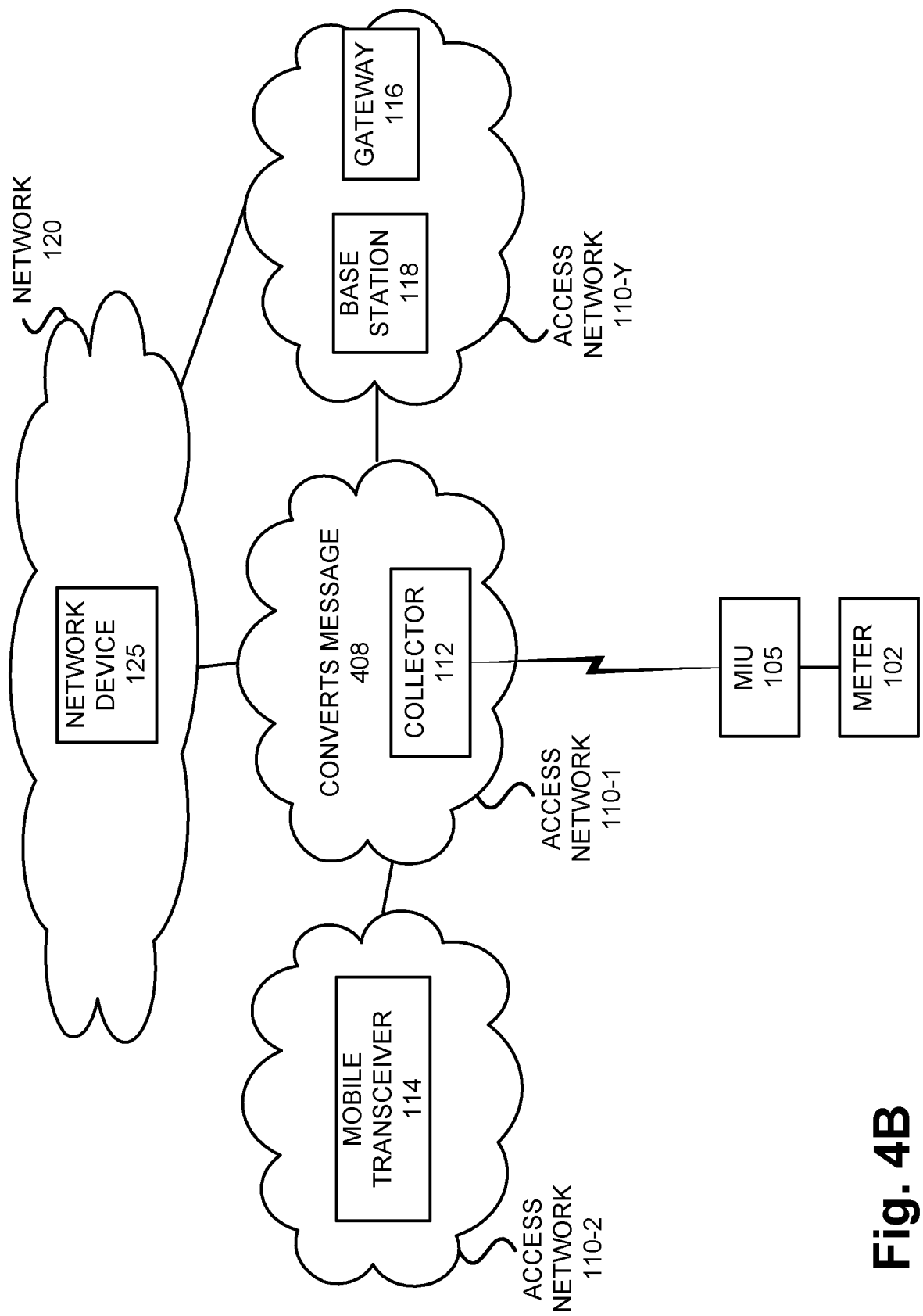
Figure 4C:
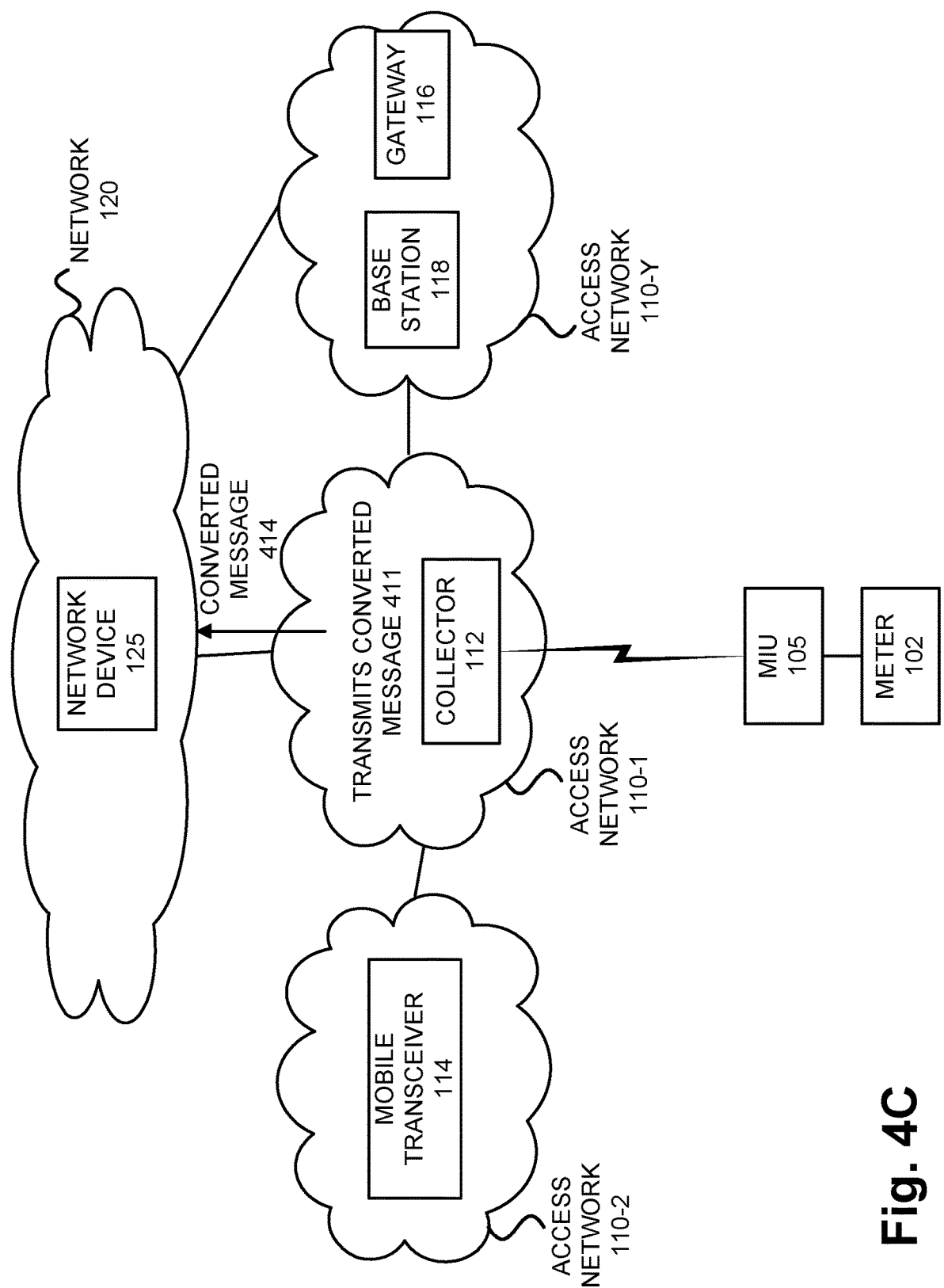

Referring to FIG. 4B, collector 112 may convert the message of a third party wireless network into a message of a fixed/proprietary network 408. For example, collector 112 may identify and extract the payload of the third party wireless network message, and insert the payload into a payload of the message of a fixed/proprietary network. Collector 112 may also extract header information and other information included in other fields (e.g., trailer, etc.) and insert or convert the information to comport with the message format of the fixed/proprietary network. In FIG. 4C, collector 411 may transmit the converted message 411 towards/to network device 125 via the network-side communication interface. Collector 112 may select a transmitter that supports the transmission of the converted message (e.g., in terms of protocol stack logic, etc.) based on the format of the converted message. As a result, a converted message 414 may be transmitted toward/to network device 125.

Figure 4D:
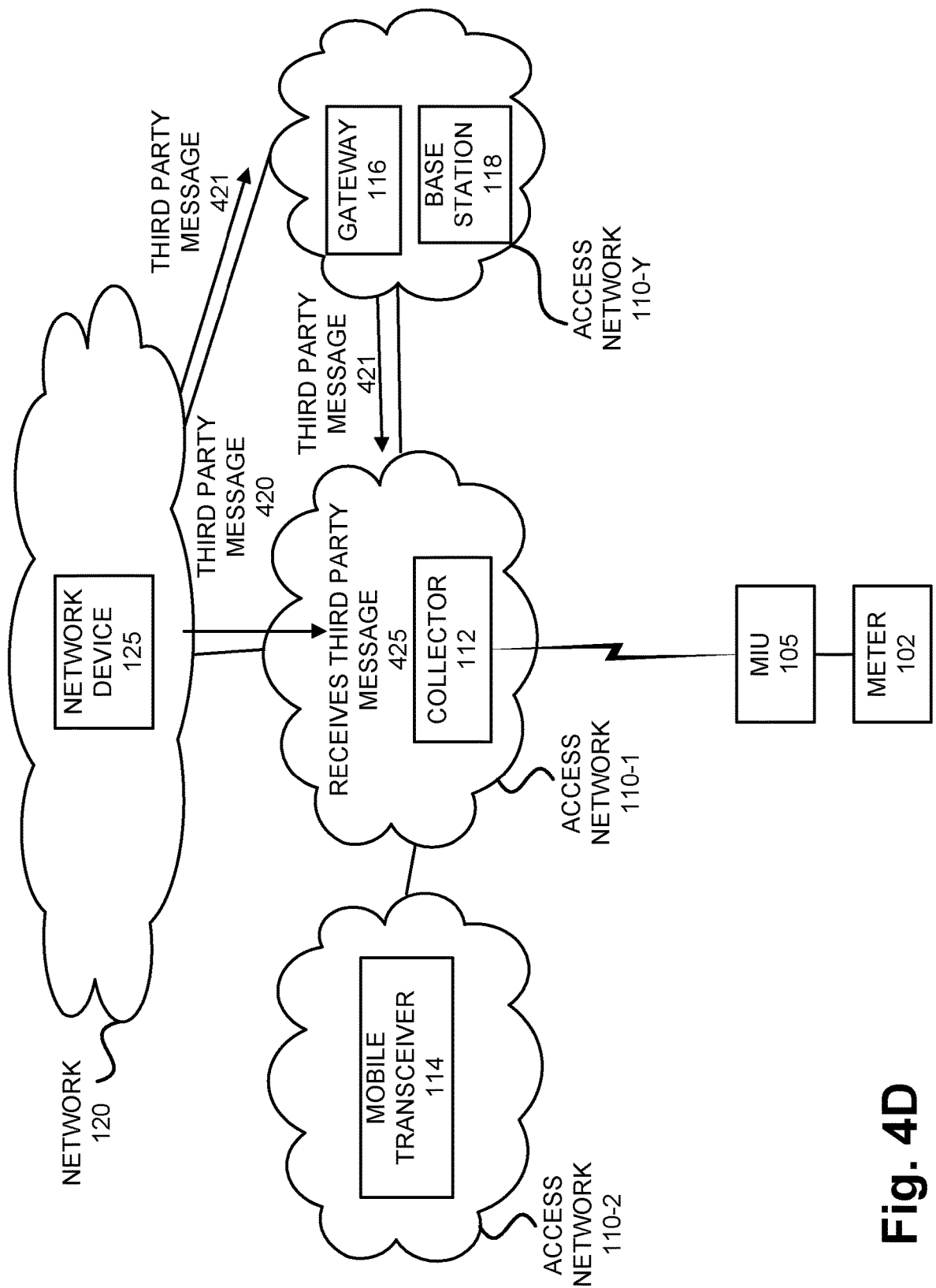
Figure 4E:
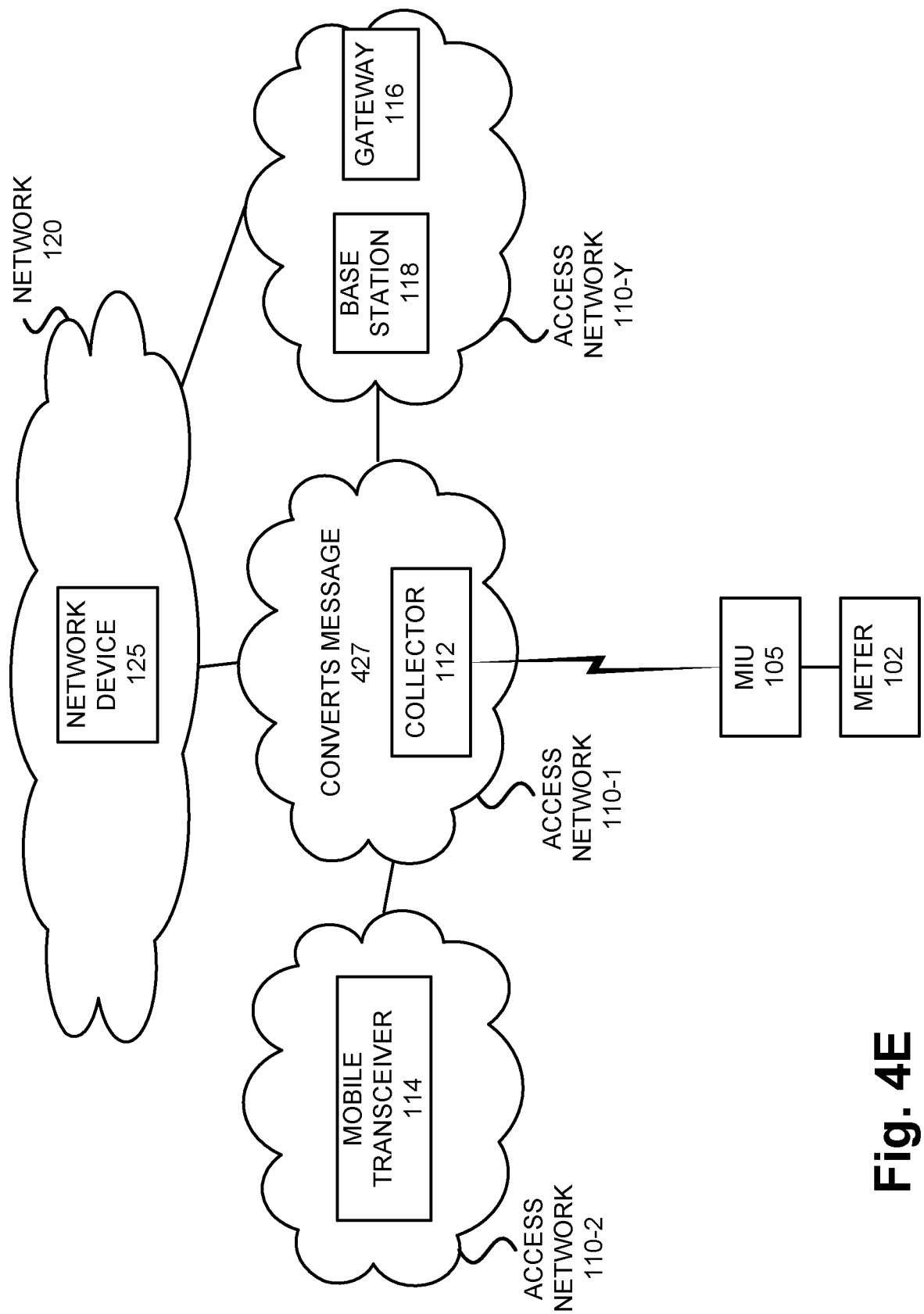

Referring to FIG. 4D, according to an exemplary scenario, assume that network device 125 may transmit a message of a third party wireless network to collector 112. As a result of the transmission, according to some scenarios, a third party message 420 may not traverse access network 110-Y, while according to other scenarios, a third party message 421 may traverse access network 110-Y, as depicted in FIG. 4D. In either case, collector 112 may receive the third party message 425. Referring to FIG. 4E, collector 408 may convert the message of the third party network to a message of a fixed/proprietary network 427. For example, collector 112 may identify and extract the payload of the third party wireless network message, and insert the payload into a payload of the message of a fixed/proprietary network. Collector 112 may also extract header information and other information included in other fields (e.g., trailer, etc.) and insert or convert the information to comport with the message format of the fixed/proprietary network.

Figure 4F:
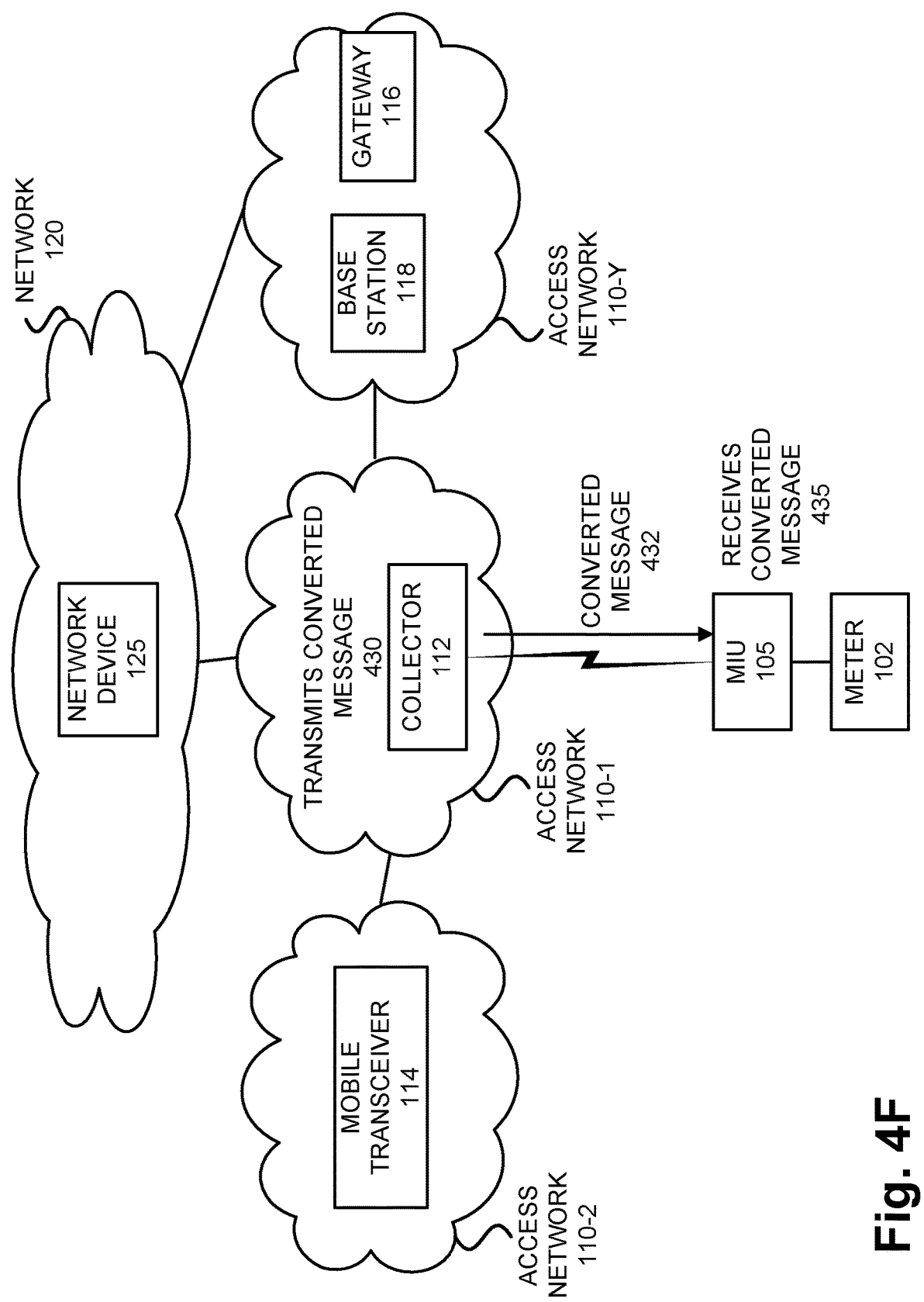

In FIG. 4F, collector 112 may transmit the converted message 430 towards/to MIU 105 via the end device-side communication interface. Collector 112 may select a transmitter that supports the transmission of the converted message (e.g., in terms of protocol stack logic, etc.) based on the format of the converted message. As a result, a converted message 432 may be transmitted toward/to MIU 105. MIU 105 may receive the converted message 435.

While FIGS. 4A-4F are diagrams illustrating exemplary processes of the repeater service, according to other exemplary embodiments, additional and/or different operations may be performed. For example, according to other exemplary scenarios, the source message and the translated message may involve different network types (e.g., a fixed/proprietary network message translated to a third party network message). Additionally, for example, according to other exemplary scenarios, one collector 112, which does not provide the repeater service, may transmit a message to another collector 112, which does provide the repeater service.

Figure 5A:
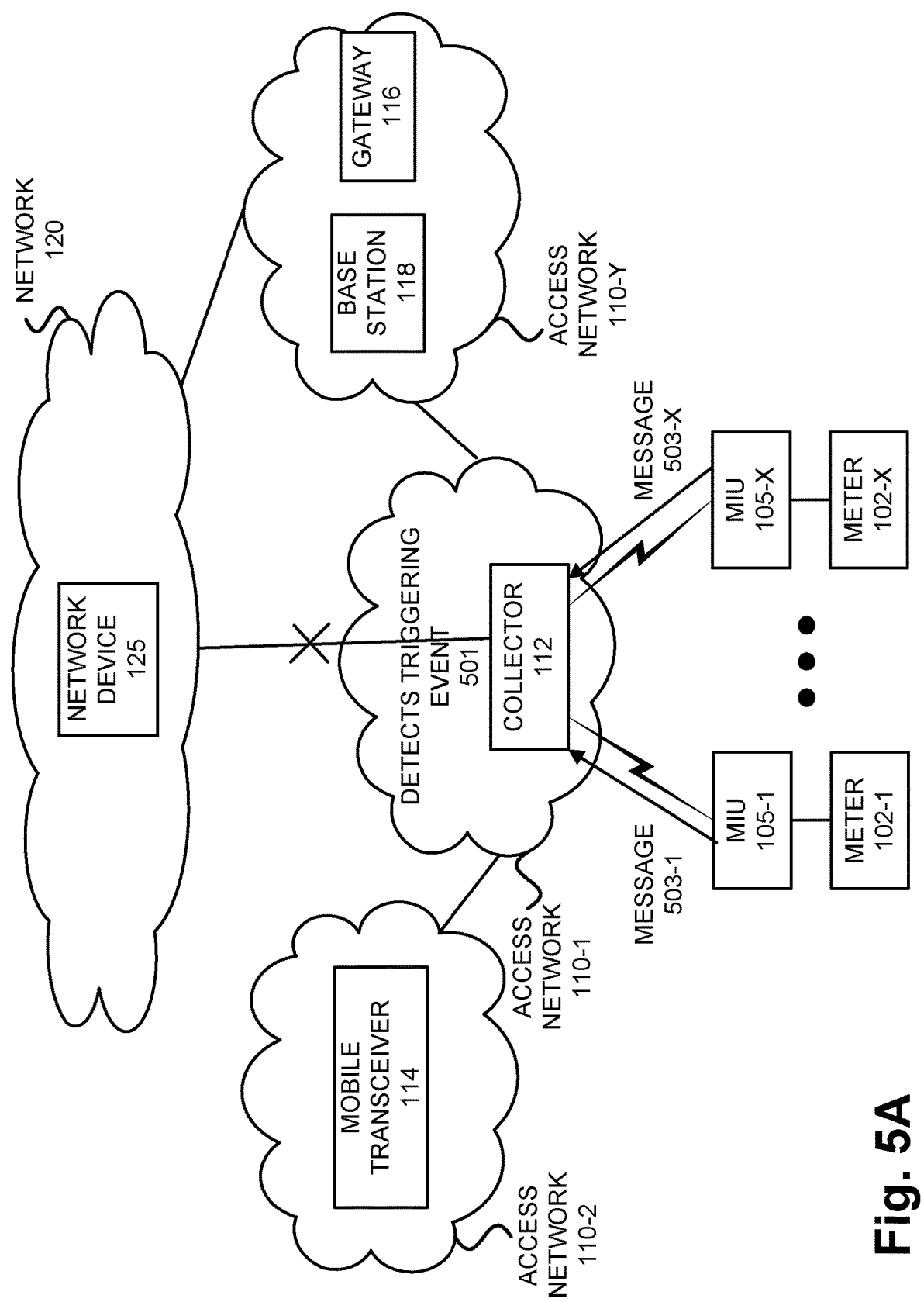
FIGS. 5A-5D are diagrams illustrating processes of other exemplary embodiments of the repeater service.
Figure 5B:
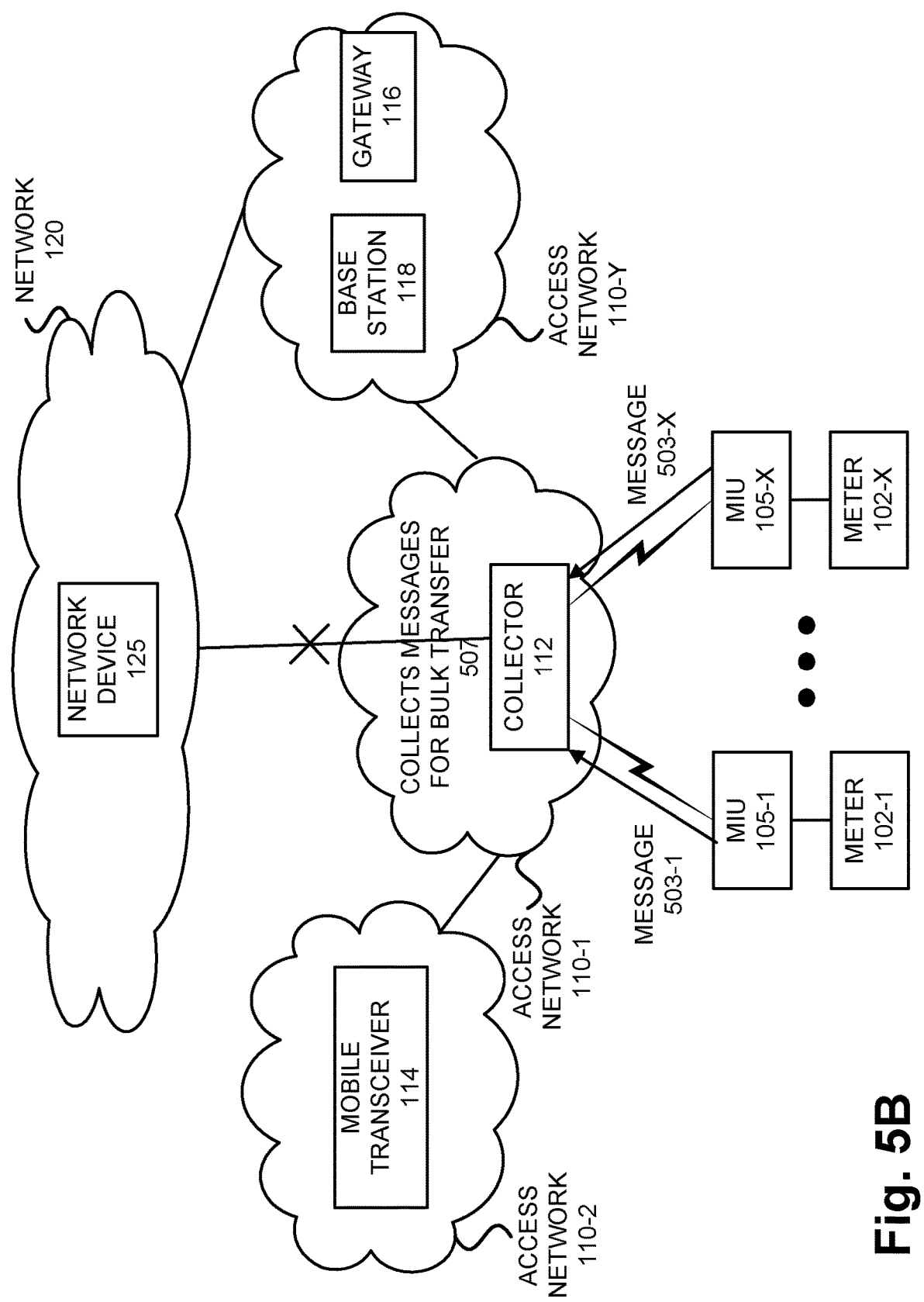
Figure 5C:
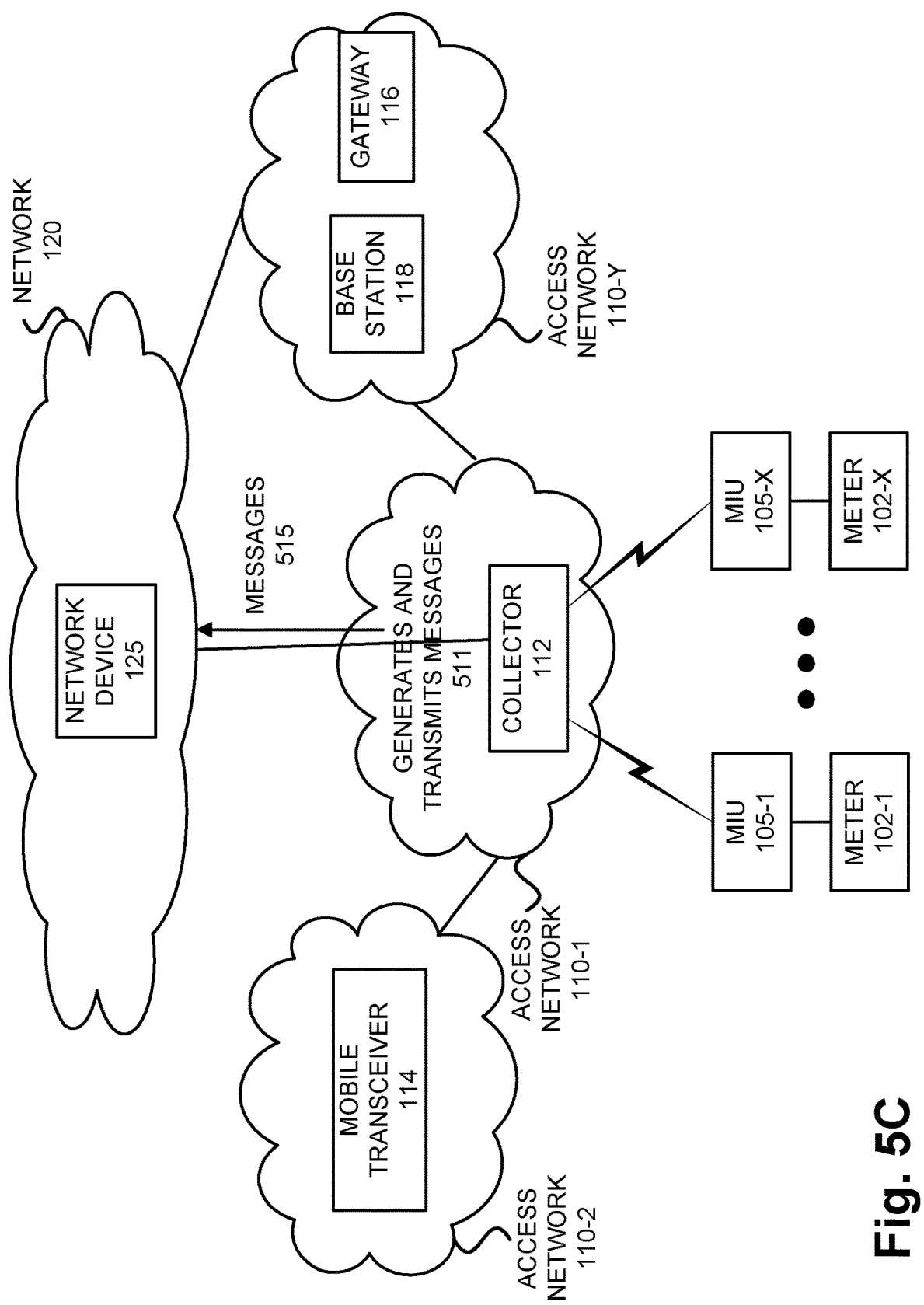

FIGS. 5A-5C are diagrams illustrating processes of other exemplary embodiments of the repeater service. Referring to FIG. 5A, collector 112 may detect a triggering event 501 that causes collector 112 to invoke the repeater service. For example, according to an exemplary scenario, assume that collector 112 detects that all next hop communication links are down. As a result, collector 112 is unable to transmit messages to network device 125 according to an otherwise regular or predetermined schedule. According to some exemplary implementations, in response to this detection, collector 112 may activate a timer. According to other exemplary implementations, collector 112 may not activate the timer.

Referring to FIG. 5B, subsequent to the invocation of the repeater service, collector 112 may receive and store messages 503-1 through 503-X from MIUs 105. As an example, messages 503 may carry meter usage information (e.g., water meter usage information for a period of time).

Collector 112 may organize these messages 503 for a bulk transfer 507 according to the repeater service. Additionally, for example, collector 112 may reformat or summarize the meter usage data.

Referring to FIG. 5C, collector 112 may detect that a next hop communication link is up, and/or may determine that the timer has expired. In response, collector 112 generates and transmits messages 511 to network device 125. As a result of the transmission, messages 515 may carry the reformatted or summarized meter usage data to be further processed by network device 125.

While FIGS. 5A-5C are diagrams illustrating exemplary processes of the repeater service, according to other exemplary embodiments, additional and/or different operations may be performed. For example, according to other exemplary scenarios, the triggering event may be different. Additionally, according to still other exemplary scenarios, the repeater service may be applied to messages destined downstream (e.g., towards MIUs 105). Additionally, according to yet other exemplary scenarios, the repeater service may perform other processes (e.g., adding data (e.g., time-of-day packets, alarm packet, etc.)) relative to a received message, as previously described. According to some exemplary implementations, the activation and expiration of the timer may indicate how long to wait before attempting to make a bulk data transmission.

Figure 5D:
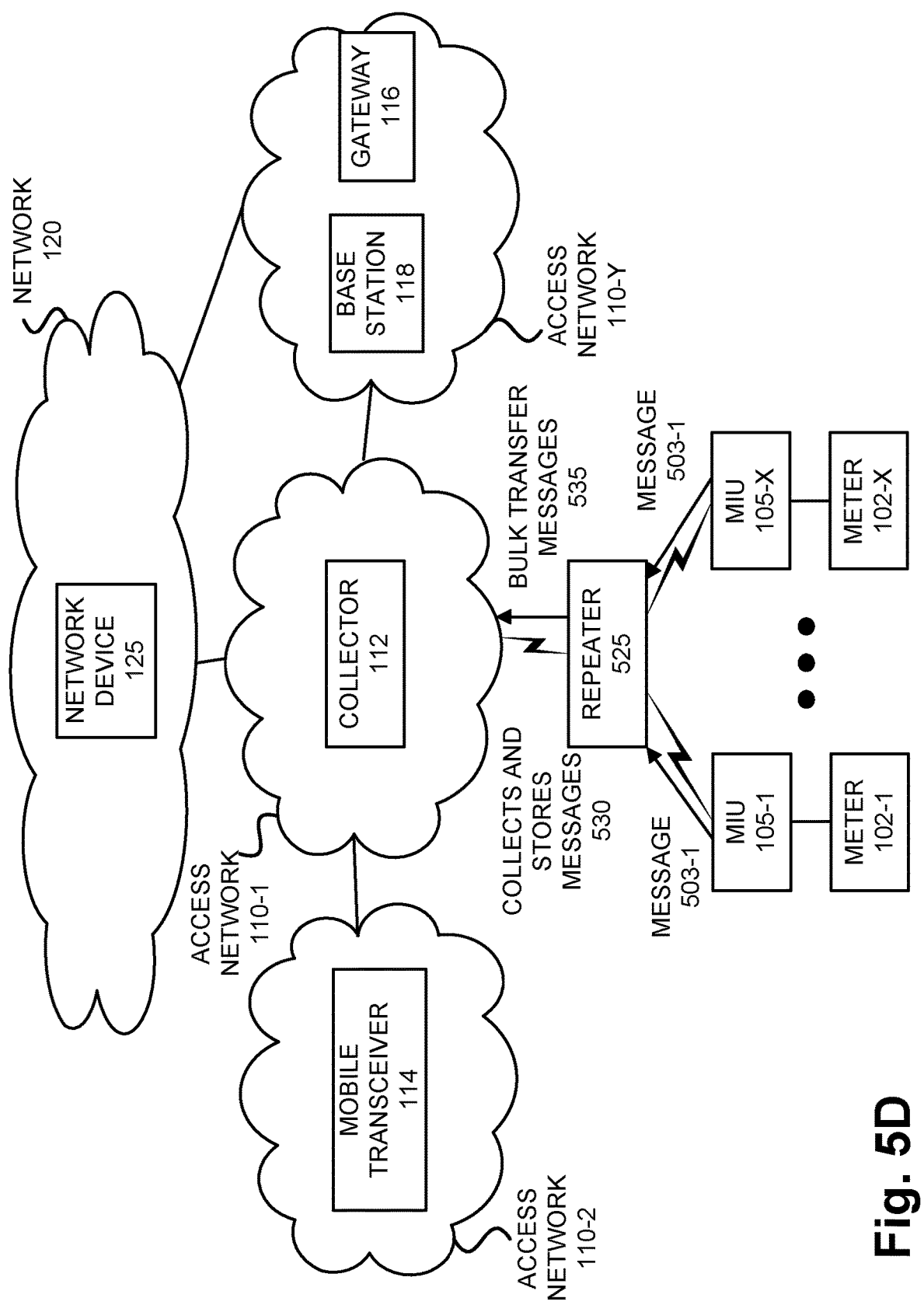

Alternatively, for example, the repeater service may be performed by a network device other than collector 112. For example, referring to FIG. 5D, the repeater service may be provided by a repeater device 525. Repeater device 525 may be located between MIUs 105 and collector 112 and may be implemented as an intermediary device, as previously described. As an example, MIUs 105 may not have sufficient transmit power to directly communicate with collector 112 given their locations. Repeater device 525 may receive messages 503, collect and store messages 530, and generate and transmit the messages to collector 112. As a result of the transmission, bulk data messages 535, which may carry meter usage data, may be communicated to collector 112.

According to some exemplary embodiments, repeater 525 may continuously provide the repeater service without a triggering event occurring. According to other exemplary embodiments, repeater 525 may provide the repeater service in response to a triggering event/mechanism, as previously described. Repeater device 525 may include components comparable to those described in FIGS. 2A-2C. For example, repeater device 525 may include an antenna, an RF frontend, a transceiver, a processor, a memory, software, and a network-side communication interface.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

Embodiments described herein may be implemented in many different forms of software executed by hardware. For example, a process or a function may be implemented as "logic," a "component," or an "element." The logic, the component, or the element, may include, for example, hardware (e.g., controller 210, etc.), or a combination of hardware and software (e.g., software 219).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., controller 210) of a device.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A collector device comprising:
   a first wireless communication interface of a first wireless network configured to receive a first message from and transmit a second message to a meter interface unit (MIU) of a water meter; and
   a second wireless communication interface of a second wireless network configured to receive a third message from and transmit a fourth message to the MIU, wherein the second wireless network is a third party network and the first wireless network is not a third party network, and wherein the first wireless communication interface and the second wireless communication interface are further configured to operate in a simultaneous mode of communication that provides for a simultaneous transmission to or simultaneous reception from the MIU of a fifth message.

2. The collector device of claim 1, wherein the second wireless network includes at least one of a Long Range Wide Area Network (LoRaWAN), a Low Power WAN (LPWAN), or a Machine Network.

3. The collector device of claim 1, further comprising:
   a network communication interface configured to receive a sixth message from and transmit a seventh message to at least one of another collector device, a network device of the second wireless network, or a backhaul system.

4. The collector device of claim 3, further comprising:
   a memory, wherein the memory stores instructions; and
   a processor, wherein the processor further executes the instructions to:
   receive, via the first wireless communication interface, an eighth message of the first wireless network;
   generate, in response to the receipt of the eighth message, a ninth message of the second wireless network, wherein the ninth message is a translation of the eighth message; and
   transmit, via the network communication interface, the ninth message towards the backhaul system.

5. The collector device of claim 3, further comprising:
   a memory, wherein the memory stores instructions; and
   a processor, wherein the processor further executes the instructions to:
   receive, via the second wireless communication interface, an eighth message of the second wireless network;
   generate, in response to the receipt of the eighth message, a ninth message of the first wireless network, wherein the ninth message is a translation of the eighth message; and
   transmit, via the network communication interface, the ninth message towards the backhaul system.

6. The collector device of claim 3, further comprising:
   a memory, wherein the memory stores instructions; and
   a processor, wherein the processor further executes the instructions to:
   receive, via the network communication interface, an eighth message of the first wireless network;
   generate, in response to the receipt of the eighth message, a ninth message of the second wireless network, wherein the ninth message is a translation of the eighth message; and
   transmit, via the second wireless communication interface, the ninth message to the MIU.

7. The collector device of claim 3, further comprising:
   a memory, wherein the memory stores instructions; and
   a processor, wherein the processor further executes the instructions to:
   receive, via the network communication interface, an eighth message of the second wireless network;
   generate, in response to the receipt of the eighth message, a ninth message of the first wireless network, wherein the ninth message is a translation of the eighth message; and
   transmit, via the first wireless communication interface, the ninth message to the MIU.

8. The collector device of claim 3, further comprising:
   a memory, wherein the memory stores instructions; and
   a processor, wherein the processor further executes the instructions to:
   detect a triggering event that invokes a bulk data transfer service;
   determine, in response to the detection of the triggering event, to collect and store incoming messages from the MIU for a preconfigured time period;
   receive, via at least one of the first wireless communication interface or the second wireless communication interface, eighth messages from the MIU during the preconfigured time period, wherein the eighth messages include water meter usage data;
   store the eighth messages;
   determine that the preconfigured time period has expired; and
   transmit, via the network communication interface, the eighth messages towards the backhaul system.

9. The collector device of claim 3, further comprising:
   a memory, wherein the memory stores instructions; and
   a processor, wherein the processor further executes the instructions to:
   receive, via the first wireless communication interface or the second wireless communication interface, an eighth message;
   generate, in response to the receipt of the eighth message, a ninth message, wherein the ninth message includes the eighth message and additional data that includes at least one of a time-of-day packet or an alarm packet; and
   transmit, via the network communication interface, the ninth message towards the backhaul system.

10. The collector device of claim 1, wherein the first wireless communication interface and the second wireless communication interface are configured to operate in an interleaving mode of communication that provides for an interleaving of data during a transmission to or a reception from the MIU of a sixth message.

11. A non-transitory, computer-readable storage medium storing instructions executable by a processor of a collector device, which when executed cause the collector device to:
receive a first messages from and transmit second messages to, via a first wireless communication interface of a first wireless network, a meter interface unit (MIU) of a water meter; and
receive third messages from and transmit fourth messages to, via a second wireless communication interface of a second wireless network, the MIU, wherein the second wireless network is a third party network and the first wireless network is not a third party network, and wherein the first wireless communication interface and the second wireless communication interface are further configured to operate in a simultaneous mode of communication that provides for a simultaneous transmission to or simultaneous reception from the MIU of a fifth message.

12. The non-transitory, computer-readable storage medium of claim 11, wherein the third party wireless network includes at least one of a Long Range Wide Area Network (LoRaWAN), a Low Power WAN (LPWAN), or a Machine Network.

13. The non-transitory, computer-readable storage medium of claim 11, wherein the instructions further comprise instructions, which when executed cause the collector device to:
receive a sixth message from and transmit a seventh message to, via a network communication interface, at least one of another collector device, a network device of the second wireless network, or a backhaul system.

14. The non-transitory, computer-readable storage medium of claim 13, wherein the instructions further comprise instructions, which when executed cause the collector device to:
receive a sixth message of the first wireless network, via the first wireless communication interface;
generate, in response to the receipt of the first message, a seventh message of the second wireless network, wherein the second message is a translation of the sixth message; and
transmit, via the network communication interface, the second message towards the backhaul system.

15. The non-transitory, computer-readable storage medium of claim 13, wherein the instructions further comprise instructions, which when executed cause the collector device to:
receive, via the second wireless communication interface, a sixth message of the second wireless network;
generate, in response to the receipt of the sixth message, a seventh message of the first wireless network, wherein the seventh message is a translation of the sixth message; and
transmit, via the network communication interface, the sixth message towards the backhaul system.

16. A method comprising:
receiving a first message from and transmitting a second message to, via a first wireless communication interface of a first wireless network, to a meter interface unit (MIU) of a water meter, wherein the first wireless communication interface is included in a collector device; and
receiving a third message from and transmitting a fourth message to, via a second wireless communication interface of a second wireless network, to the MIU, wherein the second wireless network is a third party network and the first wireless network is not a third party network, wherein the second wireless communication interface is included in the collector device, and wherein the first wireless communication interface and the second wireless communication interface are further configured to operate in a simultaneous mode of communication that provides for a simultaneous transmission to or simultaneous reception from the MIU of a fifth message.

17. The method of claim 16, wherein the second wireless network includes at least one of a Long Range Wide Area Network (LoRaWAN), a Low Power WAN (LPWAN), or a Machine Network.

18. The method of claim 16, further comprising:
receiving a sixth message from and transmitting a seventh message to, via a network communication interface, at least one of another collector device, a network device of the second wireless network, or a backhaul system, wherein the network communication interface is included in the collector device.

19. The method of claim 18, further comprising:
detecting, by the collector device, a triggering event that invokes a bulk data transfer service;
determining, by the collector device, in response to the detection of the triggering event, to collect and store incoming messages from the MIU for a preconfigured time period;
receiving, via at least one of the first wireless communication interface or the second wireless communication interface, eighth messages from the MIU during the preconfigured time period, wherein the eighth messages include water meter usage data;
storing, by the collector device, the eighth messages;
determining, by the collector device, that the preconfigured time period has expired; and
transmitting, via the network communication interface, the eighth messages towards the backhaul system.

20. The method of claim 18, further comprising:
receiving, via the first wireless communication interface or the second wireless communication interface, an eighth message;
generating, by the collector device, in response to the receipt of the eighth message, a ninth message, wherein the ninth message includes the eighth message and additional data that includes at least one of a time-of-day packet or an alarm packet; and
transmitting, via the network communication interface, the ninth message towards the backhaul system.

* * * * *